(12) United States Patent
Kawasaki et al.

(10) Patent No.: US 7,657,758 B2
(45) Date of Patent: Feb. 2, 2010

(54) PROCESSING APPARATUS AND INTEGRATED CIRCUIT TO PREVENT ILLICIT ACCESS AND REVERSE ENGINEERING

(75) Inventors: Yusuke Kawasaki, Kawasaki (JP); Hiroshi Sakurai, Kawasaki (JP); Shigeru Hashimoto, Kawasaki (JP); Koken Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 745 days.

(21) Appl. No.: 09/739,839

(22) Filed: Dec. 20, 2000

(65) Prior Publication Data

US 2002/0029345 A1 Mar. 7, 2002

(30) Foreign Application Priority Data

Jul. 13, 2000 (JP) .............................. 2000-212815

(51) Int. Cl.
*G06F 12/14* (2006.01)
*G06F 1/06* (2006.01)
*G06F 21/22* (2006.01)
*H04L 9/16* (2006.01)

(52) U.S. Cl. ........................ 713/193; 713/190; 713/191; 713/501

(58) Field of Classification Search ................. 713/193, 713/190–191, 501
See application file for complete search history.

(56) References Cited

U.S. PATENT DOCUMENTS

| 4,168,396 A | * | 9/1979 | Best ............................. 713/190 |
| 4,278,837 A | * | 7/1981 | Best ............................. 713/190 |
| 4,525,599 A | * | 6/1985 | Curran et al. ............... 713/190 |
| 4,573,119 A | * | 2/1986 | Westheimer et al. ........ 713/190 |
| 4,628,358 A | * | 12/1986 | Robbins ...................... 380/235 |
| 4,742,546 A | * | 5/1988 | Nishimura ................... 380/35 |
| 4,747,073 A | * | 5/1988 | Desbois et al. .............. 710/300 |
| 5,048,086 A | * | 9/1991 | Bianco et al. ................ 380/28 |
| 5,081,675 A | | 1/1992 | Kittirutsunetorn |
| 5,081,765 A | | 1/1992 | Fraser et al. |
| 5,237,699 A | * | 8/1993 | Little et al. ................... 714/23 |
| 5,400,331 A | * | 3/1995 | Lucak et al. ................ 370/401 |
| 5,404,402 A | * | 4/1995 | Sprunk ........................ 713/189 |

(Continued)

FOREIGN PATENT DOCUMENTS

DE 19922155 A 11/2000

(Continued)

OTHER PUBLICATIONS

IBM Technical Disclosure Bulletin, Jun. 1980, IBM, vol. 23, Issue 1, pp. 203.*

(Continued)

*Primary Examiner*—Matthew T Henning
(74) *Attorney, Agent, or Firm*—Staas & Halsey LLP

(57) ABSTRACT

A processing apparatus including an internal circuit having a CPU and internal devices and an external circuit including external devices provided externally of the internal circuit, and the like, and is aimed to prevent illicit access and reverse engineering. The internal circuit including a CPU, internal devices and a bus line connecting the CPU to the internal devices and extending externally, and the external circuit including external devices provided externally of an externally extending portion of the bus line. The internal circuit further including a ciphering section 120 provided at an entrance to an external side and ciphering addresses and data on the bus line by ciphering patterns according to a plurality of regions divided from an address space allotted to the entire external devices.

18 Claims, 16 Drawing Sheets

U.S. PATENT DOCUMENTS

| | | | |
|---|---|---|---|
| 5,428,685 A * | 6/1995 | Kadooka et al. | 713/190 |
| 5,488,661 A | 1/1996 | Matsui | |
| 5,515,540 A * | 5/1996 | Grider et al. | 713/200 |
| 5,666,516 A * | 9/1997 | Combs | 711/163 |
| 5,706,445 A * | 1/1998 | Milhaupt et al. | 710/100 |
| 5,848,159 A * | 12/1998 | Collins et al. | 380/30 |
| 5,915,025 A * | 6/1999 | Taguchi et al. | 380/44 |
| 5,943,421 A * | 8/1999 | Grabon | 380/269 |
| 6,115,144 A * | 9/2000 | Hirokawa | 358/468 |
| 6,226,237 B1 * | 5/2001 | Chan et al. | 710/14 |
| 6,272,637 B1 * | 8/2001 | Little et al. | 713/194 |
| 6,345,359 B1 * | 2/2002 | Bianco | 713/190 |
| 6,895,506 B1 * | 5/2005 | Abu-Husein | 713/193 |
| 6,910,094 B1 * | 6/2005 | Eslinger et al. | 711/5 |
| 6,971,022 B1 * | 11/2005 | Katta et al. | 713/193 |
| 6,981,156 B1 * | 12/2005 | Stern et al. | 726/12 |
| 6,985,582 B1 * | 1/2006 | Sano et al. | 380/42 |
| 6,986,053 B1 * | 1/2006 | Schwartz et al. | 713/193 |
| 6,989,052 B1 * | 1/2006 | Wu et al. | 106/31.29 |
| 7,000,119 B1 * | 2/2006 | Jia et al. | 713/194 |
| 7,005,733 B2 * | 2/2006 | Kommerling et al. | 257/679 |
| 7,010,124 B1 * | 3/2006 | Ishiguro et al. | 380/201 |
| 7,069,404 B1 * | 6/2006 | Roche | 711/164 |
| 7,111,176 B1 * | 9/2006 | Ellison et al. | 726/34 |
| 7,188,255 B1 * | 3/2007 | Toh et al. | 713/191 |
| 7,194,092 B1 * | 3/2007 | England et al. | 380/262 |
| 7,266,202 B1 * | 9/2007 | Kawakami et al. | 380/283 |
| 2002/0178083 A1 * | 11/2002 | Cianciarulo et al. | 705/26 |

FOREIGN PATENT DOCUMENTS

| | | |
|---|---|---|
| EP | 0660215 A | 6/1995 |
| EP | 0 720098 A1 | 7/1996 |
| FR | 2 787 216 A | 6/2000 |
| WO | WO 99 13615 | 3/1999 |
| WO | WO 0019321 A | 4/2000 |

OTHER PUBLICATIONS

Microsoft Press Computer Dictionary Third Edition, 1997, Microsoft Press, p. 302.*

Schneier, "Applied Cryptography", Second Edition, 1996, John Wiley and Sons, pp. 180-181.*

Microsoft Computer Dictionary Third Edition, 1997, Microsoft Corporation, pp. 68.*

Bruce Schneier, "Applied Cryptography, Second Edition", 1996, John Wiley and Sons, pp. 225.*

* cited by examiner

PROCESSING APPARATUS AND INTEGRATED CIRCUIT TO PREVENT ILLICIT ACCESS AND REVERSE ENGINEERING

BACKGROUND OF THE INVENTION

1. Field of the Invention

The present invention relates to a processing apparatus comprising an internal circuit having a CPU and internal devices, and an external circuit including external devices provided externally of the internal circuit, and to an integrated circuit having a CPU and an internal device mounted thereon and capable of providing an external devices externally of the integrated circuit.

2. Description of the Related Art

With the recent development of LSI, a CPU executing programs, a memory storing the programs executed by the CPU and various other devices have been able to be integrated on one chip, which contributes greatly to making an apparatus small in size, cost reduction and the like. To manufacture such LSI, it suffices to mount a memory storing programs on a LSI chip if a system executes the same programs irrespectively of users and does not need to change programs after completion. However, if it is necessary to execute different programs according to users or to change a program while the program is in use, it is desirable to constitute LSI so that an external memory can be further provided externally of the LSI having the above constitution and to store programs which may be possibly changed while in use or programs which differ according to users in the external memory.

Meanwhile, in case of a system capable of adding such an external memory externally of the LSI, however, there is a probability that the content of the external memory is illicitly rewritten or the external memory is replaced by a memory storing an illicit program and having the same specification as that of the external memory, with the result that important programs or data stored in the internal memory are illicitly accessed and the contents of the programs or data are illicitly interpreted. The following is one example of this case.

Recently, IC cards and magnetic cards each having a cash value or a point value corresponding to a cash as data is spreading increasingly. Following this, it is of urgent necessity to ensure data security so as to prevent the fabrication or falsification of cards. To this end, methods of preventing the reverse engineering of an apparatus were attempted in the past. Despite these attempts, it is the present situation that illicit ROMs and the like are created and apparatuses are incessantly abused against developers' will.

SUMMARY OF THE INVENTION

The present invention has been made in view of the above circumstances. It is, therefore, an object of the present invention to provide a processing apparatus and an integrated circuit intended to prevent illicit access and reverse engineering.

The first processing apparatus of the present invention to attain the above object is characterized by comprising:

an internal circuit including a CPU executing programs, at least one internal circuit having a predetermined function and a bus line connecting the CPU to the internal device, extending externally and transferring an address and data; and an external circuit provided externally of an externally extending portion of the bus line and including at least one external device having a predetermined function, wherein the internal circuit includes a ciphering section interposed at an entrance to an external side and ciphering the address and the data on the bus line by ciphering patterns according to a plurality of regions divided from an address space allotted to entirety of the at least one external device.

Here, the ciphering patterns adopted by the ciphering section include one ciphering pattern in which neither the address nor data is ciphered.

As stated above, by dividing the address space into a plurality of areas and ciphering the address and the data by the patterns which differ according to the divided areas, it is made difficult to interpret ciphers.

In the first processing apparatus of the present invention stated above, it is preferable that the external circuit includes a plurality of external devices; and the ciphering section performs ciphering using ciphering patterns according to the plurality of external devices, respectively.

By doing so, it is possible to perform ciphering according to the property of the external device as follows. If a flash ROM is provided as one of the external devices, for example, both the address and the data are ciphered for the flash ROM. As for a RAM, as one of the external devices, which can read continuous addresses at high speed, only the data is ciphered or the addresses are ciphered but the lower bit side of the addresses continuously read are not ciphered. If an I/O device is provided as one of the external devices, neither the address nor data is ciphered.

Further in the first processing apparatus of the present invention stated above, it is preferable that the ciphering section outputs a dummy address and dummy data to the externally extending portion of the bus line at timing at which the external circuit is not accessed.

This makes illicit interpretation more difficult.

Furthermore, in the first processing apparatus of the present invention stated above, it is preferable that the CPU is supplied with a clock and executes the programs synchronously with the supplied clock, and the ciphering section is supplied with a clock and performs ciphering synchronously with the supplied clock; and a clock supply section for supplying a clock at a higher speed than a speed of the clock supplied to the CPU, to the ciphering section.

This makes complicated ciphering possible.

Moreover, in the first processing apparatus of the present invention, it is preferable that the processing apparatus comprises ciphering pattern determination means for recognizing a constitution of the external circuit and determining a ciphering pattern of the ciphering section according to the constitution of the external circuit.

By providing this ciphering pattern determination means, it becomes unnecessary to carry out operations such as the operator's determination of ciphering patterns according to different constitutions of the external circuit.

Further, in the first processing apparatus of the present invention stated above, it is preferable that the ciphering section ciphers the address and the data on the bus line by ciphering patterns according to the plurality of regions divided from the address space allotted to the entirety of the no less than one external device and according to application programs executed by the CPU.

This makes ciphering patterns more complicated and illicit interpretation more difficult.

Furthermore, in the first processing apparatus of the present invention stated above, it is preferable that a deciphering section connected to the externally extending portion of the bus line, and returning the ciphered address and the data on the bus line to an address and data which are not ciphered.

If debugging is to be performed without providing this deciphering section, the debugging becomes extremely difficult since the address and data are ciphered. Considering this, this deciphering section is provided, thereby making it possible to easily carry out debugging at the time of developing the processing apparatus.

This deciphering section becomes unnecessary after the completion of debugging. Therefore, it is preferable that the deciphering section is detached from the processing apparatus, fixed to a disabled state or destroyed.

Additionally, in the first processing apparatus of the present invention stated above, it is preferable that the processing apparatus comprises ciphering pattern change means for changing a ciphering pattern whenever a predetermined initialization operation is carried out for one of the plurality of regions divided from the address space allotted to the entirety of the at least one external device.

By resetting the ciphering pattern in a predetermined initialization operation, e.g., when the processing apparatus is powered on or reset and the like, illicit interpretation is made more difficult and security thereby enhances.

Also, in the first processing apparatus of the present invention stated above, it is preferable that the ciphering section adopts a ciphering pattern in which ciphered data is changed according to the address, for one of the plurality of regions divided from the address space allotted to the entirety of the at least one external device, to thereby cipher the data.

By adopting the function of addresses as a ciphering function to cipher the data, complicated ciphering is made possible, illicit interpretation is made more difficult and data security thereby enhances.

The second processing apparatus among the processing apparatuses of the present invention is characterized by comprising:

an internal circuit including a CPU executing programs, at least one internal device having a predetermined function, and a bus line connecting the CPU to the internal device, extending externally and transferring an address and data; and an external circuit provided externally of the externally extending portion of the bus line, and storing information, wherein the internal circuit has information rewrite means for ciphering and rewriting at least part of the information stored in the memory in a predetermined initial operation.

Here, the predetermined initialization operation typically indicates an initialization operation when the apparatus is first powered on.

By ciphering and rewriting the content of the memory in the predetermined initialization operation such as, for example, the initialization operation when the apparatus is first powered on, data security further enhances.

In this case, it is preferable that the information rewrite means generates a random number, and performs ciphering by adopting a ciphering pattern using the generated random number.

If so, information is ciphered by a ciphering pattern which no one, including persons of a processing apparatus manufacturer, knows and data security thereby further enhances.

In the second processing apparatus of the present invention stated above, it is preferable that the at least part of the information stored in the memory has been already ciphered before the predetermined initialization operation is carried out; and the information rewrite means temporarily returns the at least part of the information to information which is not ciphered, and rewrites the information by ciphering again the information by adopting a different ciphering pattern.

In this case, deciphering information for returning the at least part of information stated above to information before being ciphered may be stored in the memory; and the information rewrite means may temporarily return the at least part of information to the information before being ciphered using the deciphering information.

In this way, by ciphering information by a different pattern at the time of shipment from a factory, security further enhances.

Further, as described above, in case of ciphering the information by a different ciphering pattern at the time of shipment from a factory, at least part of information stated above may be ciphered by a public key and a secret key may be embedded in this processing apparatus;

the information rewrite means may temporarily return the at least part of information to the information before being ciphered using the secret key, or an information acquisition section for acquiring ciphered deciphering information to return the at least part of information to the information before being ciphered may be provided; and the information rewrite means may decipher the ciphered deciphering information which is acquired by the information acquisition section, fetch deciphering information in plain text, and temporarily return the at least part of information to the information before being ciphered using this deciphering information in plain text.

If the public key is employed as a ciphering pattern, information ciphered by the public key is written into a memory and the ciphered information is returned to information before being ciphered using the secret key embedded inside of the apparatus, security among, for example, a plurality of companies and the like which employ processing apparatuses having the same specification, respectively, can be ensured by passing only the public key to each company.

Further, by constituting the processing apparatus so that deciphering information can be acquired from externally, it is possible to obtain the deciphering information from a key management center and the like by, for example, communications and the like and flexible system can be, therefore, constituted.

Moreover, in the second processing apparatus of the present invention stated above, it is preferable that the internal circuit holds a ciphering pattern adopted by the ciphering section;

the processing apparatus further comprises a tamper detection section detecting tamper; and ciphering pattern destruction means for destroying the ciphering pattern held in the internal circuit in response to tamper detection made by the tamper detection section.

When this processing apparatus is illicitly, forcibly opened or disassembled, the tamper detection is made. In response to the tamper detection, the ciphering pattern is destroyed, thereby making illicit interpretation further difficult and contributing to further enhancing security.

Moreover, the first integrated circuit among integrated circuits of the present invention to attain the above object, is characterized by constituted by mounting: a CPU executing programs; at least one internal device having a predetermined function; a bus line connecting the CPU to the internal device, externally extending, at least one external device having a predetermined function provided externally of the externally extending portion of the bus line, and transferring an address and data; and a ciphering section interposed at an entrance to an external side, and ciphering the address and the data on the bus line by ciphering patterns according to a plurality of regions divided from a space allotted to entirety of the at least one external device provided externally of the externally extending portion of the bus line.

The first integrated circuit of the present invention has the above constitution and exhibits the same function and advantage as those of the first processing apparatus of the present invention. Besides, the fist integrated circuit is an integrated circuit (LSI). Thus, it is made difficult to interpret the circuit arrangement and the like. In this respect, too, the first integrated circuit contributes to enhancing security.

Here, in the first integrated circuit stated above, as in the case of the first processing apparatus of the present invention, it is preferable that the ciphering patterns adopted by the ciphering section typically include a ciphering pattern in which neither the address nor data is ciphered; it is preferable that if a plurality of external devices are provided externally of the externally extending portion of the bus line, the ciphering section performs ciphering by the ciphering patterns according to the plurality of external devices, respectively; and it is preferable that the ciphering section outputs a dummy address and dummy data to the externally extending portion of the bus line at the timing at which the external circuit is not accessed.

Further, it is preferable that the first integrated circuit comprises ciphering pattern change means for changing a ciphering pattern whenever a predetermined initialization operation is performed, for one of the plurality of regions divided from the address space allotted to the entirety of the at least one external device.

It is also preferable that the ciphering section ciphers the data by adopting a ciphering pattern in which ciphered data is changed according to the address, for one of the plurality of regions divided from the address space allotted to the entirety of the at least one external device.

Moreover, the second integrated circuit among the integrated circuits of the present invention is characterized by comprising: a CPU executing programs; at least one internal device having a predetermined function; and a bus line connecting the CPU to the internal device, extending externally, a memory storing information provided externally of an externally extending portion of the bus line, and transferring an address and data; wherein the integrated circuit includes information rewrite means for ciphering and rewriting at least part of the information stored in the memory in a predetermined initialization operation.

The second integrated circuit of the present invention has the above constitution and exhibits the same function and advantage as those of the second processing apparatus of the present invention as in the case of the relationship between the first processing apparatus of the present invention and the first integrated circuit of the present invention. Besides, the second integrated circuit is an integrated circuit (LSI). Thus, it is made difficult to interpret the circuit arrangement and the like. Also in this respect, the second integrated circuit contributes to enhancing security.

Here, in the second integrated circuit of the present invention, the above predetermined initialization operation, similar to the second processing apparatus of the present invention, typically indicates an initialization operation when the apparatus is first powered on, it is preferable that the information rewrite means generates a random number, adopts a ciphering pattern using the generated random number and thereby performs ciphering;

it is preferable that at least part of the information stored in the memory is already ciphered before the predetermined initialization operation is executed; and it is preferable that the information rewrite means rewrite the at least part of information by temporarily returning the at least part of information to the information before being ciphered, adopting a different ciphering pattern and re-ciphering the information.

In the present invention, it is possible to consider that one ciphering arithmetic system is one ciphering pattern according to the present invention, it is possible to consider that if the ciphering arithmetic systems differ, the ciphering patterns differ, and it is possible to consider that if the ciphering arithmetic system is common and variables and the like used in the ciphering arithmetic systems differ, the ciphering patterns differ.

BRIEF DESCRIPTION OF THE DRAWINGS

FIG. 3 is a flow chart of an initialization program executed when the processing apparatus shown in FIG. 1 is powered on.

FIG. 15 is a flow chart showing a flash ROM scrambling part of the program operating when power is turned on.

FIG. 19 is a flow chart showing a flash ROM scrambling part of the program executed when the processing apparatus shown in FIG. 18 is powered on.

DETAILED DESCRIPTION OF THE PREFERRED EMBODIMENTS

The embodiments of the present invention will be described hereinafter.

Figure 1:
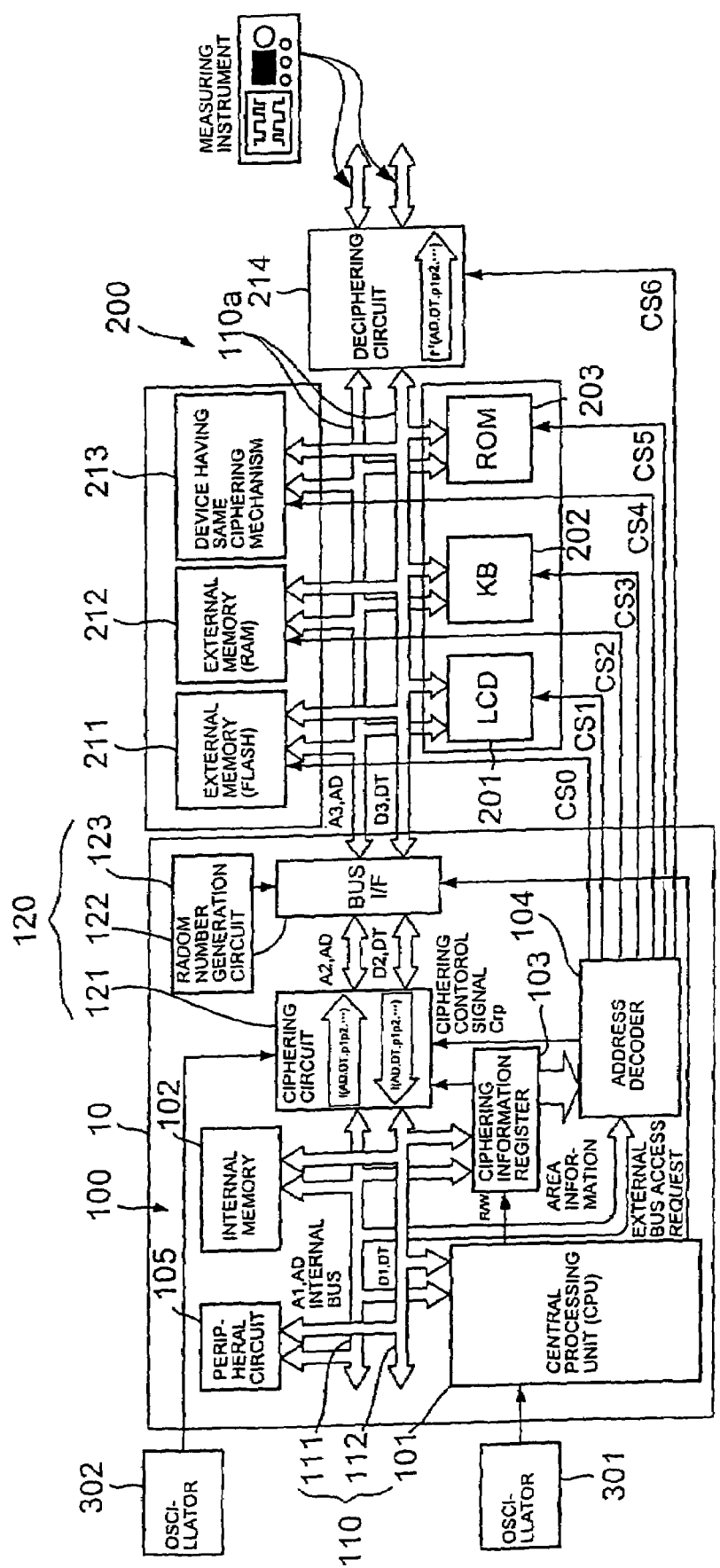
FIG. 1 is a block diagram of the first embodiment of a processing apparatus according to the present invention.

FIG. 1 is a block diagram showing the first embodiment of a processing apparatus according to the present invention.

A processing apparatus 1 shown in FIG. 1 consists of a internal circuit 100 mounted inside of an LSI 10, an external circuit 200 provided externally of the LSI 10 and the others including oscillators 301 and 302 and the like. This LSI 10 corresponds to one embodiment of an integrated circuit of the present invention.

The internal circuit 100 provided within the LSI 10 has a central processing unit (CPU) 101 as well as an internal memory 102, a ciphering information register 103, an address decoder 104 and a peripheral circuit 105 which are internal devices according to the present invention. The CPU 101 and the various internal devices are mutually connected through a bus line 110. This bus line consists of an address bus 111 and a data bus 112 and extends externally of the LSI 10. Various external devices are connected to a portion 110a of the bus line 110 which extends externally. The external devices will be described later.

The internal circuit 100 constituted within the LSI 10 is provided with a ciphering section 120 interposed at an entrance to an external side. This ciphering section 120 consists of a ciphering circuit 121, a bus interface 122 and a random number generation circuit 123.

A clock signal from the oscillator 301 is inputted into the CPU 101. The CPU 101 executes various programs synchronously with the clock signal received from the oscillator 301.

A clock signal from another oscillator 302 which generates a clock signal higher in repetition frequency than the clock signal inputted into the CPU 101, is inputted into the ciphering circuit 121. The ciphering circuit 121 conducts a ciphering processing synchronously with the clock signal with a high repetition frequency from the oscillator 302. The detail of the ciphering processing will be described later.

The above two oscillators 301 and 302 generate clock signals synchronous with each other. Therefore, the oscillators 301 and 302 may generate clock signals by dividing a high-speed clock obtained by a common oscillation source.

Further, a plurality of external devices, i.e., in case of FIG. 1, a liquid crystal display (LCD) 201, a keyboard (KB) 202, a read-only memory (ROM) 203, a flash ROM 211 and a random-access memory (RAM) 212, are connected to the externally extending portion 110a of the bus line 110. In FIG. 1, a device 213, such as another LSI, which is the same in constitution as the LSI 10 shown in FIG. 1 and which has the same ciphering mechanism as that of the internal circuit 100, and a deciphering circuit 214 for debugging programs operated by the CPU 101 are also connected to the externally extending portion 110a. The device 213 and the deciphering circuit 214 are shown in FIG. 1 for description purposes. The device 213 is connected to the LSI 10 if cipher communication is established between the LSI 10 and the device 213 having a similar constitution to that of the LSI 10. The deciphering circuit 214 is connected for program debugging and detached after the completion of debugging.

The LCD 201 and the KB 202 as well as, in case of the embodiment shown in FIG. 1, the ROM 203 belong to external devices which cipher neither addresses nor data. The flash ROM 211 and the RAM, by contrast, belong to external devices which cipher and access addresses or data. Here, the flash ROM 211 ciphers only data and the RAM ciphers both addresses and data. Further, the device 213 ciphers both addresses and data and establishes cipher communication with the LSI 10. When connected to the LSI 10, the deciphering circuit 214 belongs to the devices which cipher neither addresses nor data in this embodiment.

Here, the bus line 110 is divided into a portion connected to the CPU 101 (the address and data of which portion are denoted by A1 and D1, respectively), a portion put between the ciphering circuit 121 and the bus interface 122 (the address and data of which portion are denoted by A2 and D2, respectively) and the externally extending portion 110a of the LSI 10 (the address and data of which portion are denoted by A3 and D3, respectively).

Figure 2:
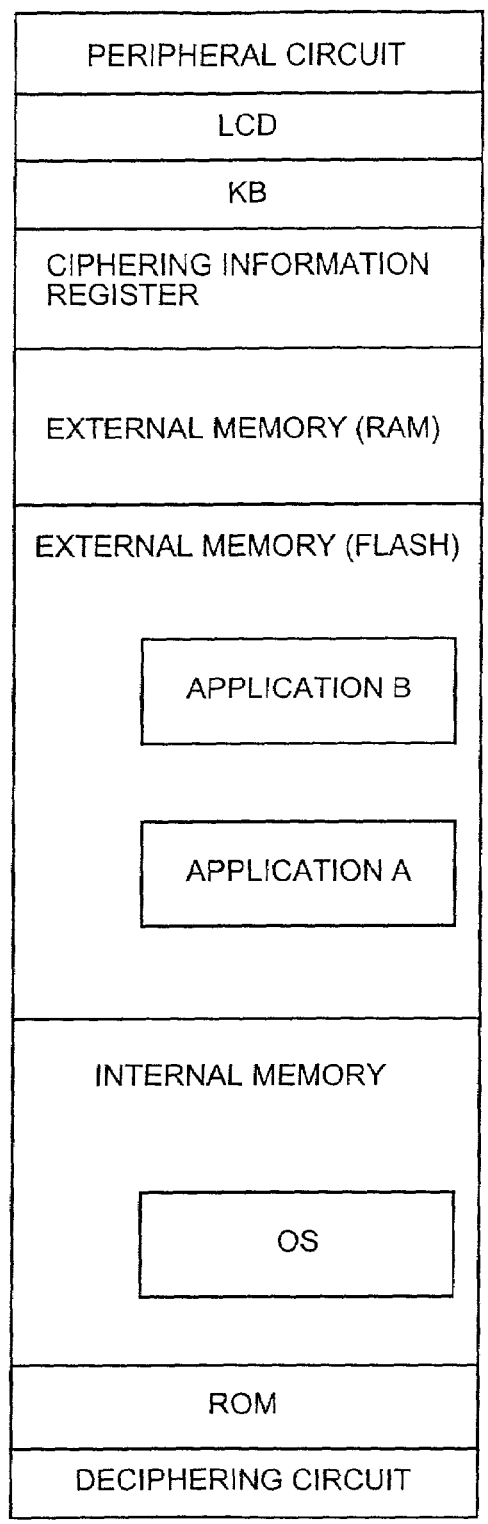
FIG. 2 shows a memory map of the processing apparatus shown in FIG. 1.

FIG. 2 shows the memory map of the processing apparatus shown in FIG. 1.

A plurality of application programs are stored in the flash ROM which is one of the external devices. OS programs are stored in the internal memory which is one of the internal devices. Also, apparatus constitution information on this processing apparatus, e.g., types of external devices connected and memory capacities are recorded on the ROM which is one of the external devices.

Figure 3:
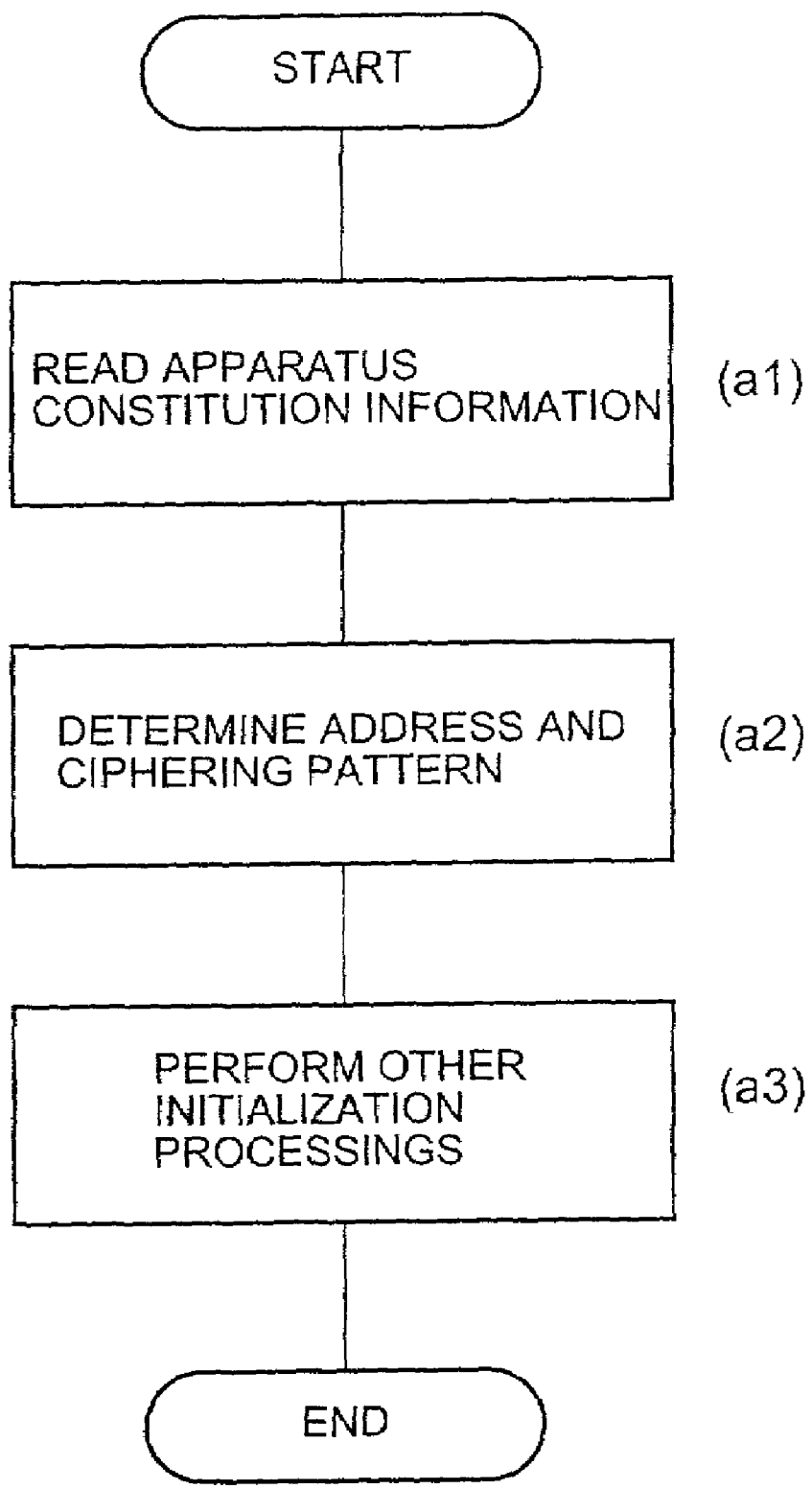

FIG. 3 is a flow chart of an initialization program executed when the processing apparatus shown in FIG. 1 is powered on. This initialization program is stored in the internal memory 102 as one of the OS programs and executed by the CPU 101 when power is turned on.

According to the initialization program shown in FIG. 3, first, the apparatus constitution information stored in the ROM 203 which is one of the external devices is read (in a step a1), a memory map as shown in FIG. 2 is created based on the information and a ciphering pattern is determined for each area of the memory map (in a step a2). It is noted that ciphering patterns include a pattern in which neither addresses nor data are ciphered.

In this initialization program, various other initialization processings follow (in a step a3).

Description will be continued, with reference back to FIG. 1.

The CPU 101 reads and writes information using the address A1 and the data D1. The external devices are accessed using the address A3 and the data D3 irrespectively of whether it is necessary to cipher the devices or not (or it is prohibit the devices from being ciphered).

The CPU 101 writes area information on areas to be ciphered (ciphered areas) and a ciphering pattern for each ciphered area on the memory map shown in FIG. 2, in a ciphering information register 103.

The address decoder 104 inputs the address A1 and receives the area information indicating to-be-ciphered areas from the ciphering information register 103. Then, the address decoder 104 outputs chip select signals CS0 to CS6 to an access target device and outputs a ciphering control signal Crp indicating which device is an access target and whether or not it is necessary to conduct ciphering, to the ciphering circuit 121.

The ciphering circuit 121 receives the ciphering control signal Crp from the address decoder, conducts ciphering according to the ciphered areas when it is necessary to cipher the address A1 and data D1 based on the ciphering pattern information recorded on the ciphering pattern information register 103, and outputs the address A2 and data D2. The address A2 and data D2 are outputted externally of the LSI 10 as address A3 and data D3 by way of the bus interface 123.

An external bus access signal indicating whether an external device is to be accessed, is transmitted from the CPU 101 to the bus interface 122. The bus interface 122 outputs the address A2 and data D2 outputted externally from the ciphering circuit 121 as the external address A3 and data D3 when access to the external device is requested, generates a dummy address and dummy data based on the random number from the random number generation circuit 123 and outputs the dummy address and dummy data as the external address A3 and data D3 when access to the external device is not requested. This makes illicit interpretation more difficult.

The conversion of addresses and data from internally to externally has been described. As for the data D3 read from the external flash memory 211, RAM 212, ROM 203 and the like is fetched into the internal side as the data D2. If the data is ciphered data, the ciphering circuit 121 deciphers the ciphered data and transmits the data to the CPU 101 and the like as data D1 which is not ciphered.

In this embodiment, as the ciphering pattern, a ciphering pattern in which neither addresses nor data are ciphered is adopted. In addition, the following ciphering patterns are adopted:

(1) Type 1
   A3=A1 XOR p1
   D3=D1 XOR p1
(2) Type 2
   A3=A1
   D3=A1+D1+p1
(3) Type 3
   The higher level and lower level of the data as a result of the operation of type 2 are replaced.

In above types, reference p1 denotes an appropriate constant obtained by, for example, random numbers;

A XOR B signifies performing an exclusive OR operation for bits corresponding to A and B, and A+B signifies an addition operation if A and B are assumed as numeric values.

As already described above with reference to FIG. 3, in the initialization operation when power is turned on, the CPU 101 reads the apparatus constitution information stored in the ROM 203 which is one of the external devices, creates a memory map as shown in FIG. 2 and determines a ciphering pattern for each ciphered area. The flash ROM 211 adopts the ciphering pattern of, for example, (2) above in which the address is not ciphered and only the data is ciphered, and the RAM 212 adopts the ciphering pattern of, for example, (1) above in which both the address and the data are ciphered.

The RAM 212 adopts the ciphering pattern of type 1 in (1) above. Therefore, if it is assumed that p1=0 x 5555 (0 x means that following '5555' is a hexadecimal), both the address and the data become completely different values from the original address and data as follows:

$$A3(0 \times 5455) = A1(0 \times 0100) \text{XOR } p1(0 \times 5555)$$

$$D3(0 \times 5476) = D1(0 \times 0123) \text{XOR } p1(0 \times 5555).$$

Further, the flash ROM 211 adopts the ciphering pattern of type 2 in (2) above. Therefore, if it is assumed that p1=0 x 5555, the address has no change and the data becomes a completely different value from the original data as follows:

A3 (0 x 0100)=A1 (0 x 0100)

$$D3(0 \times 5778) = A1(0 \times 0100) + D1(0 \times 0123) + p1(0 \times 5555).$$

Here, in ciphering the data, the data is a function of the address A1. Due to this, even if the data is the same, i.e., D1, the ciphered data D3 differs from the original data according to the address A1, thereby further making illicit interpretation difficult and further enhancing security.

It is noted that the above description is a calculative example of a ciphering pattern. If an address is to be ciphered, a ciphering algorithm is taken into consideration so that a ciphered address does not overspread the address area of the ciphering target device and does not move to the address area of a device other than the ciphering target device.

In addition, even with the same RAM 212, it is possible to change ciphering patterns for accessing the RAM 212 according to application programs executed by the CPU 101. By not only selecting a ciphering pattern according to a memory area (a to-be-accessed external device) but also changing ciphering patterns according to application programs even in the same memory area (same external device), the address and data outputted to the externally extending portion 110a of the bus line 110 are ciphered in a more complicated manner, thereby making illicit interpretation further difficult and further enhancing security.

Here, if it is assumed that the CPU 101 and the ciphering circuit 121 operate at the same clocks, the ciphering circuit 121 cannot perform a complex ciphering operation. For example, if the CPU 101 accesses an external device at one-clock intervals, the ciphering circuit 121 is required to complete its ciphering processing within one clock. In case of the type 3 ciphering processing in (3) above, for example, it requires one-clock time to perform the type 2 ciphering in (2) and it further requires one-clock time to exchange the higher level and lower level bits. Namely, it requires a total of two-clock time and it is necessary for the ciphering circuit 121 to complete the ciphering processing within one clock, then the ciphering pattern type 3 in (3) cannot be adopted.

In case of the embodiment shown in FIG. 1, the oscillator 302 which generates a higher-speed clock than that of the oscillator 301 which supplies a clock to the CPU 101, is provided and the ciphering circuit 121 operates synchronously with the higher-speed clock supplied from the oscillator 302. Thus, for example, the ciphering pattern of type 3 in (3) above or a more complicated ciphering pattern which requires a plurality of clocks can be adopted.

For example, if a clock with 10 MH$_z$ is supplied to the CPU 101 and a clock with 100 MH$_z$ is supplied to the ciphering circuit 121, the ciphering circuit can perform a ciphering processing using 10 clocks.

Moreover, the internal circuit 100 of the processing apparatus shown in FIG. 1 is incorporated into the LSI 10 and address and data ciphered through the ciphering circuit 121 and the bus interface 122 are outputted from the LSI 10. With the address and data as they are, it is quite difficult for the CPU 101 to execute program debugging when developing a product employing this LSI 10. In view of this, a deciphering circuit 214 is connected to the processing circuit shown in FIG. 1.

Before debugging, information on a ciphering pattern and a ciphered area having the same content as that written into the ciphered information register 103 from the CPU 101 are written into this deciphering circuit 214. In the following debugging, the deciphering circuit 214 deciphers the ciphered address and data outputted to the externally extending portion 110a of the bus line 110 based on the information on the ciphering pattern and the ciphered area written in advance, and deciphers the address to an address and data which are not ciphered. By doing so, it is possible to monitor the address and data deciphered by the deciphering circuit 214 by using, for example, a measuring instrument and to easily debug programs executed by the CPU 101.

If this deciphering circuit 214 is left undetached, the significance of ciphering the address and data with a view to making illicit interpretation difficult is lost. For that reason, the deciphering circuit 214 is constituted as a device different from the processing apparatus and detached therefrom after the completion of debugging. Alternatively, the deciphering circuit 214 may remain attached thereto to be completely disabled.

Further, as shown in FIG. 1, the device 213 having the same ciphering mechanism as that of the LSI 10 is connected. If a plurality of LSIs 10 are combined as shown in FIG. 1, it is possible to establish cipher communication among the LSIs on the substrate.

Figure 4:
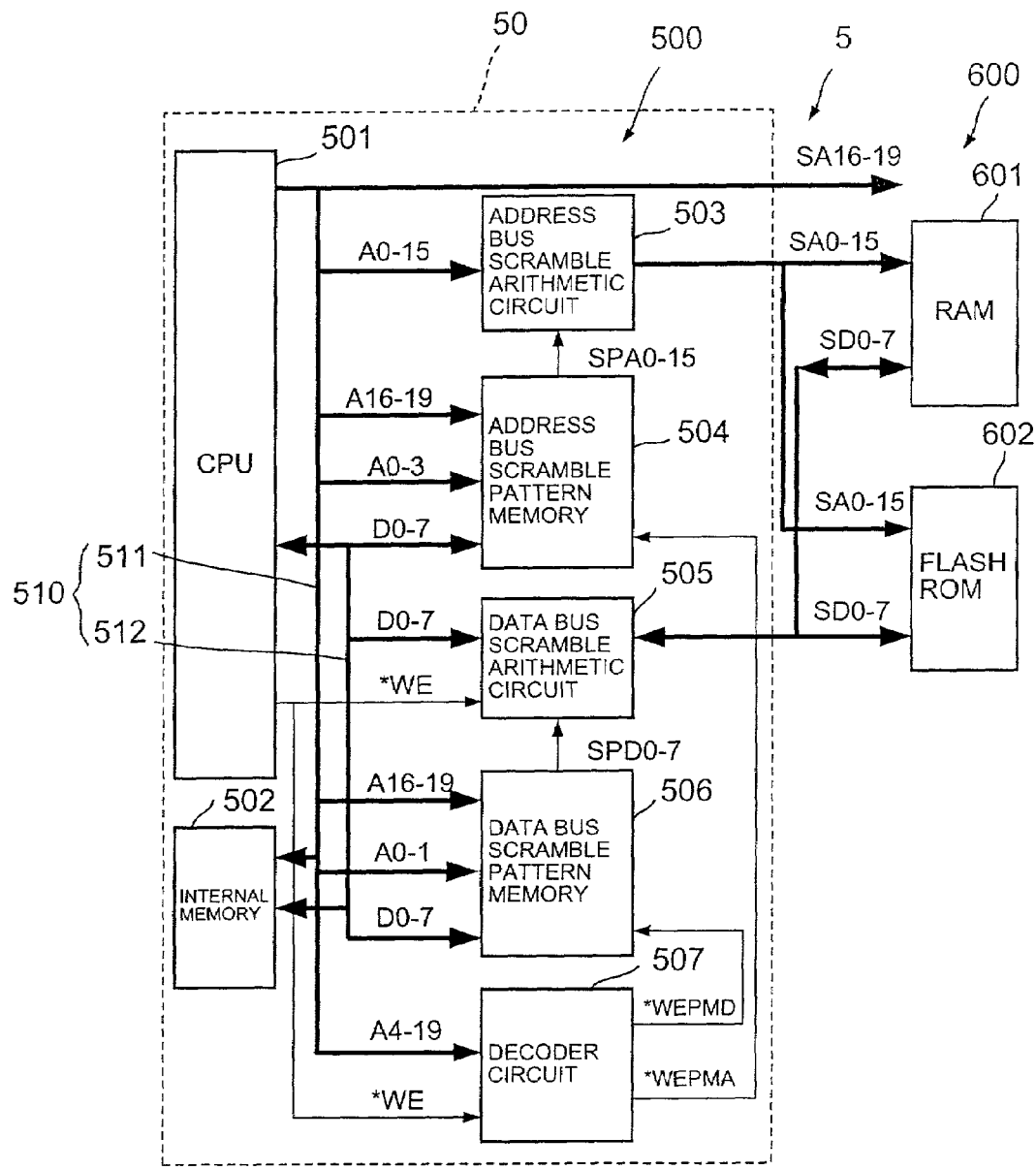
FIG. 4 is a block diagram of the second embodiment of a processing apparatus according to the present invention.

FIG. 4 is a block diagram of the second embodiment of a processing apparatus according to the present invention.

A processing apparatus 5 shown in FIG. 4 consists of an internal circuit 500 incorporated into an LSI 50 and an external circuit 600 provided externally of the LSI 50. The LSI 50 also corresponds to one embodiment of an integrated circuit according to the present invention.

The internal circuit 500 incorporated into the LSI 50 has a CPU 501, an internal memory 502, an address bus scramble arithmetic circuit 503, an address bus scramble pattern memory 504, a data bus scramble arithmetic circuit 505, a data bus scramble pattern memory 506 and a decoder circuit 507. All of these constituent elements are mutually connected through a bus line 510. The bus line 510 consists of an address bus 511 and a data bus 512. Although the internal circuit 500 is also provided with other internal devices, those devices are not shown and not described herein.

Among the constituent elements of the internal circuit 500 incorporated into the LSI 10 shown in FIG. 4, the composition of the constituent elements except for the CPU 501 and the internal memory 502, i.e., the composition of the address bus scramble arithmetic circuit 503, the address bus scramble pattern memory 504, the data bus scramble arithmetic circuit 505, the data bus scramble pattern memory 506 and the decoder circuit 507 corresponds to one example of a ciphering section according to the present invention.

Also, a RAM 601 and a flash ROM 602 constituting the external memory 600 are connected to an externally extending portion of the bus line of the LSI 50.

OS programs are stored in the internal memory 502 constituting the internal circuit 500. Application programs are stored in the flash ROM 602 constituting the external circuit 600. These various programs are executed by the CPU 501 of the internal circuit 500. Further, various data are stored in the RAM 601 constituting the external circuit 600 so as to be freely readable and writable.

The address bus scramble arithmetic circuit 503 and the data bus scramble arithmetic circuit 505 are arithmetic circuits which scramble (cipher) addresses A0 to A15 and data D0 to D7, respectively. Scramble patterns employed in arithmetic operations performed by the address bus scramble arithmetic circuit 503 and the data bus scramble arithmetic circuit 505 are stored in the address bus scramble pattern memory 504 and the data bus scramble memory 506, respectively. The address bus scramble pattern memory 504 and the data bus scramble pattern memory 506, which are constituted of nonvolatile memories and the like, respectively, can hold the contents of data even if the processing apparatus is powered off. In addition, scramble patterns can be rewritten by the CPU 501.

In this embodiment, an exclusive OR circuit is employed for each of the address bus scramble arithmetic circuit 503 and the data bus scramble arithmetic circuit 505.

Figure 5:
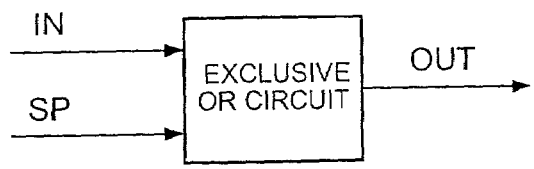
FIG. 5 shows an exclusive OR circuit.

FIG. 5 shows an exclusive OR circuit.

An input IN (address A0 to A15 or data D0 to D7) is inputted into the exclusive OR circuit shown in FIG. 5 (which is either the address bus scramble arithmetic circuit or the data bus scramble arithmetic circuit 506 shown in FIG. 4) by way of the bus line 510, and a scramble pattern SP (SPA0 to SPA15 or SPD0 to SPD7) is also inputted into the exclusive OR circuit from the address bus scramble pattern memory 504 or the data bus scramble pattern memory 506. As an output OUT (SA0 to SA15 or SP0 to SP7), $$\text{OUT} = \text{IN XOR SP} \tag{1}$$

where XOR indicates an exclusive OR, is outputted from the exclusive OR circuit.

Here, by setting all bits of the scramble pattern SP at 0, scrambling can be prohibited. By setting a part of these bits at 0, scrambling for corresponding bits can be prohibited. For example, if lower level 4 bits out of 16 bits of the scramble pattern SP are set to be always 0, the lower level 4 bits are not scrambled (ciphered).

An exclusive OR circuit which performs an operation based on the formula (1) above is employed for each of the address scramble arithmetic circuit 503 and the data bus scramble arithmetic circuit 505 (which will be generally referred to as 'scramble arithmetic circuit' hereinafter). Now, various types of circuit constitutions which can be adopted for the scramble arithmetic circuit, will be shown by way of example.

FIGS. 6 to 9 show circuit constitutions which can be adopted as the scramble arithmetic circuits, respectively.

Figure 6:
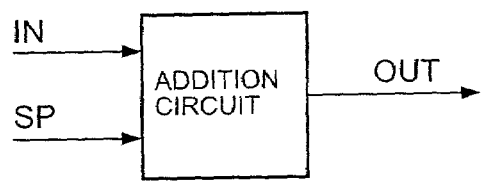
FIG. 6 shows a circuit constitution which can be adopted as a scramble arithmetic circuit.

An adder circuit is adopted for the scramble arithmetic circuit shown in FIG. 6 and performs an operation of:

$$\text{OUT} = \text{IN} + \text{SP} \tag{2}$$

Figure 7:
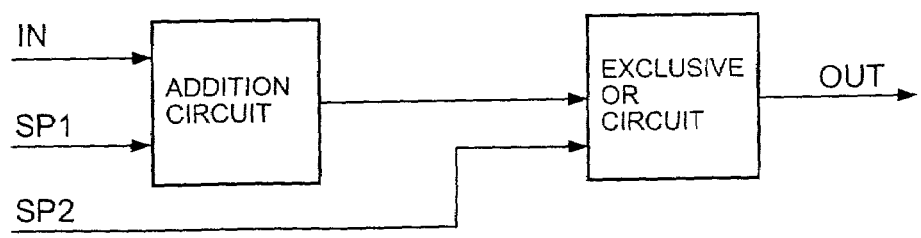
FIG. 7 shows a circuit constitution which can be adopted as the scramble arithmetic circuit.

FIG. 7 shows an adder circuit and an exclusive OR circuit and the following operation is performed:

$$\text{OUT} = (\text{IN} + \text{SP1}) \text{ XOR SP2} \tag{3}$$

where SP1 and SP2 denote two scramble patterns either different or the same.

Figure 8:
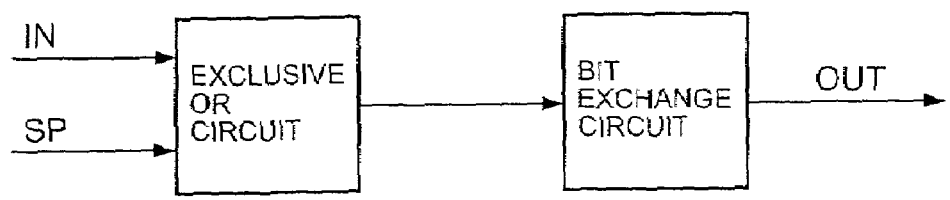
FIG. 8 shows a circuit constitution which can be adopted as the scramble arithmetic circuit.

Further, FIG. 8 shows an exclusive OR circuit and a bit switching circuit and the following operation is performed:

$$\text{OUT} = (\text{IN XOR SP})_m \tag{4}$$

(after an exclusive OR operation is performed, higher level bits and lower level bits are switched by m bits).

Figure 9:
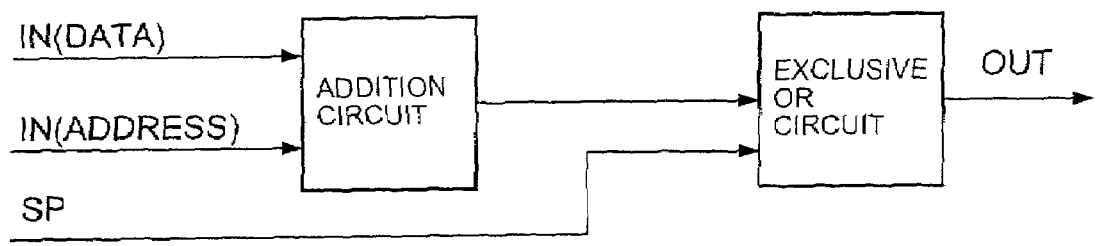
FIG. 9 shows a circuit constitution which can be adopted as the scramble arithmetic circuit.

Furthermore, FIG. 9 shows an adder circuit and an exclusive OR circuit and the following operation is performed:

$$\text{OUT} = (\text{IN (data)} + \text{IN (address)}) \text{ XOR SP} \tag{5}$$

where, IN (data) denotes data on the data bus and IN (address) denotes an address on the address bus. It is noted that the operation based on the formula (5) is performed by a circuit which can be adopted as the data bus scramble arithmetic circuit 505. If an address is used to scramble data, quite complicated scrambling which makes illicit interpretation further difficult, is carried out.

Figure 10:
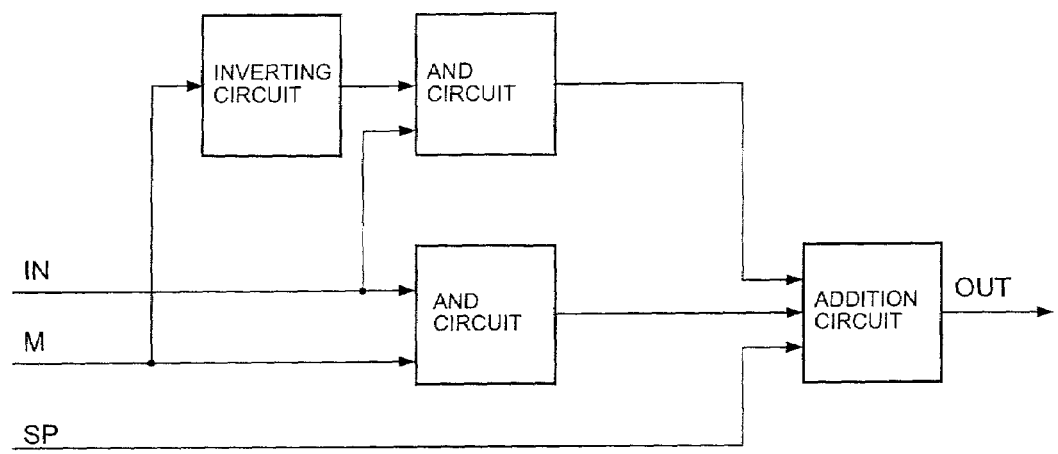
FIG. 10 shows one example of the scramble arithmetic circuit to which a mask pattern for scrambling only specified bits is added.
Figure 11:
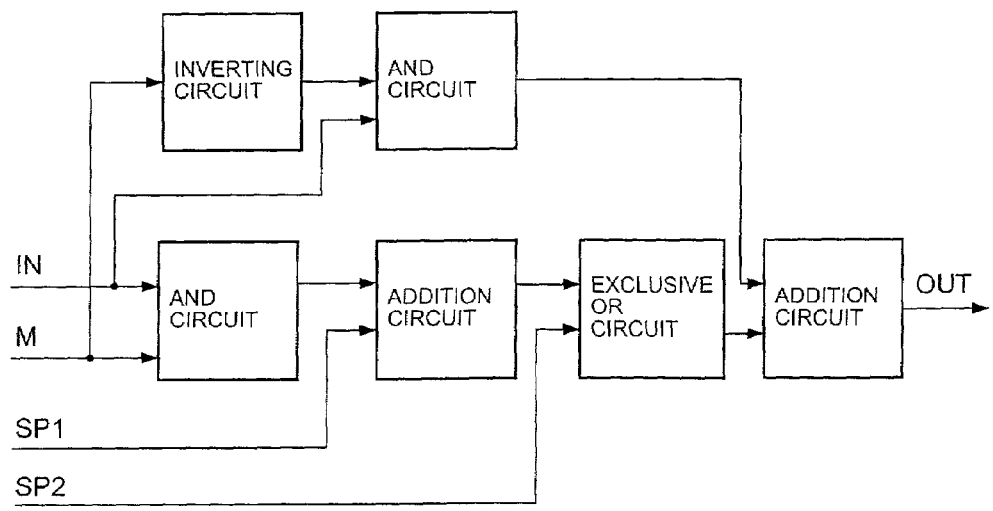
FIG. 11 shows another example of the scramble arithmetic circuit to which a mask pattern for scrambling only specified bits is added.

FIGS. 10 and 11 shows examples of the scramble arithmetic circuits to each of which a mask pattern is added so as to scramble only specified bits.

The scramble arithmetic circuit shown in FIG. 10 consists of one inverting circuit, two AND circuits and one adder circuit, and performs the following operation:

$$OUT=(IN \text{ and } M)+SP+(IN \text{ and } (\text{not } M)) \qquad (6)$$

In the formula (6), M denotes a mask pattern. The bits of the mask pattern M which are set at 0, are not subjected to scrambling. For example, if the lower level 4 bits out of 16 bits are prohibited from being scrambled, the mask pattern M is set at 0 x FFF0.

Further, the scramble arithmetic circuit shown in FIG. 11 is constituted by connecting one inverting circuit, two AND circuits, two adder circuits and one exclusive OR circuit as shown in FIG. 11, and performs the following operation:

$$OUT = (((IN \text{ and } M) + Sp1) XOR\ SP2) + \\ (IN \text{ and } (\text{not } M)) \qquad (7)$$

As exemplified above, various arithmetic circuits can be adopted for the scramble arithmetic circuit.

Figure 12:
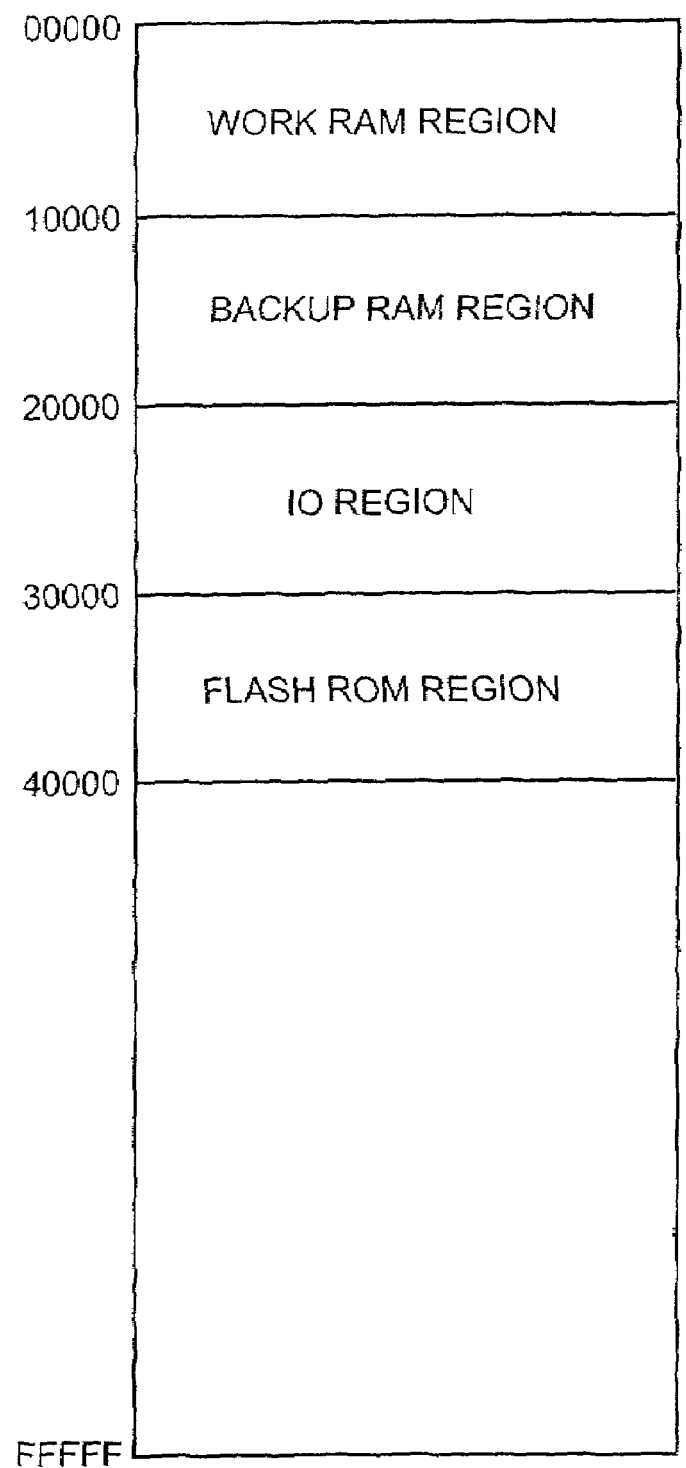
FIG. 12 is an address map of the processing apparatus at the second embodiment shown in FIG. 4.

FIG. 12 is the address map of the processing apparatus 5 in the second embodiment shown in FIG. 4.

Although FIG. 4 typically shows only one RAM, a work RAM and a backup RAM are actually provided. The work RAM is allotted an address region (work RAM region) of 0 x 00000 to 0 x 0FFFF. The backup RAM backs up data and holds the content of the data using a battery and the like even if the apparatus is powered off.

In addition, 0 x 20000 to 0 x 2FFFF indicate an IO region and 0 x 30000 to 0 x 3FFFF indicate a flash ROM region. Various application programs are stored in the flash ROM. The address bus scramble pattern memory 504 and the data bus scramble pattern memory 506 shown in FIG. 4 are allotted to the IO region (0 x 2xxxx region).

Here, the decoder circuit shown in FIG. 4 outputs a write enable signal *WEPMD of the data bus scramble pattern memory 506 and a write enable signal *WEPMA of the address bus scramble pattern memory 504 in accordance with a truth table of Table 1 based on the addresses A4 to A19.

TABLE 1

| A19 | A18 | A17 | A16~5 | A4 | *WEPMD | *WEPMA |
|-----|-----|-----|-------|----|--------|--------|
| 0 | 0 | 1 | ALL 0 | 0 | 0 | 1 |
| 0 | 0 | 1 | All 0 | 1 | 1 | 0 |
| 1 | * | * | * | * | 1 | 1 |
| * | 1 | * | * | * | 1 | 1 |
| * | * | 0 | * | * | 1 | 1 |
| * | * | * | ≠ALL 0 | * | 1 | 1 |

The Table 1 signifies that the data bus scramble pattern memory 506 turns into a writable state (*WEPMD=0) at 0 x 2000X, and that the address bus scramble pattern memory 504 turns into a writable state (*WEPMA=0) at 0 x 2001X.

Figure 13:
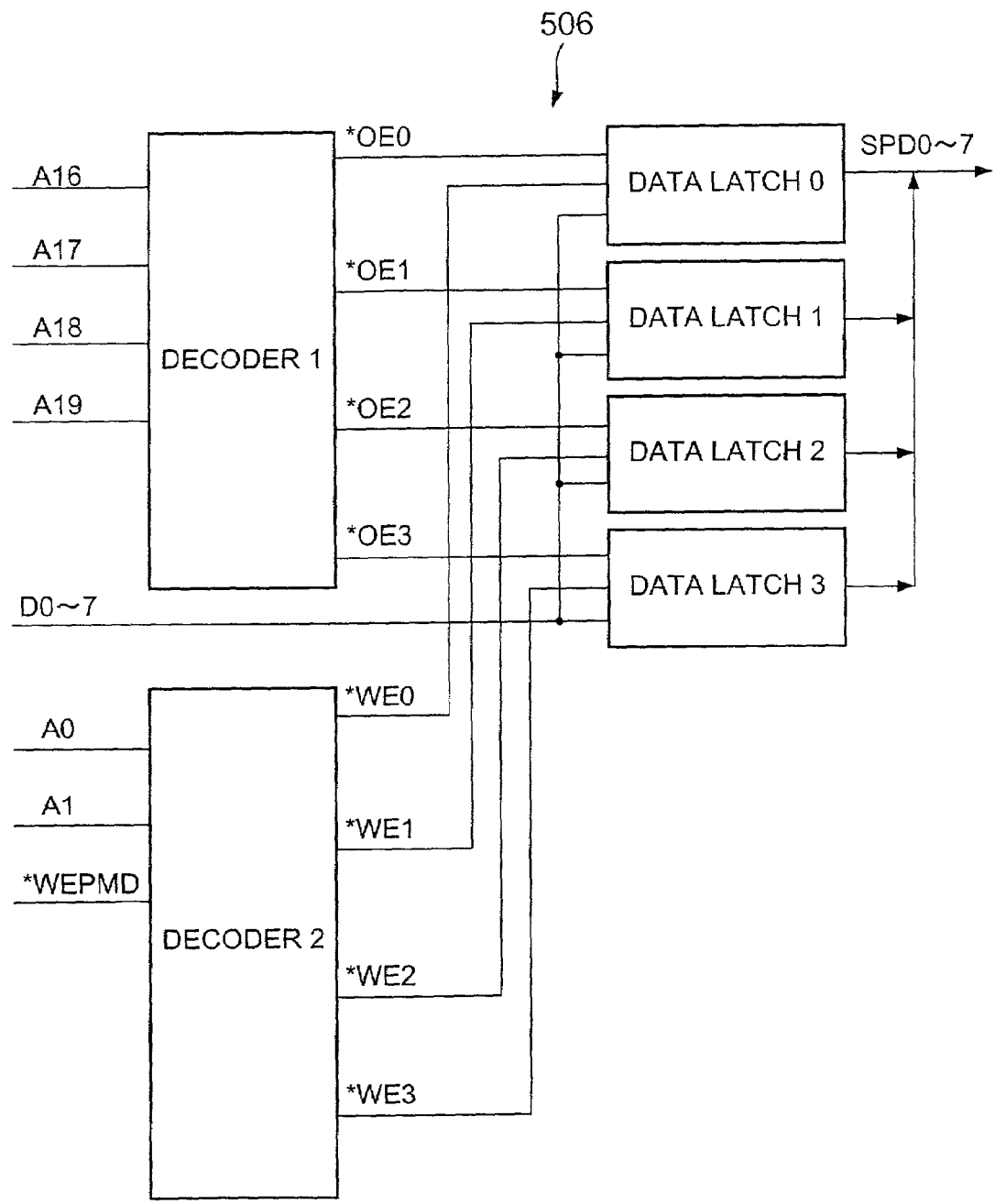
FIG. 13 shows a constitution of a data bus scramble pattern memory.

FIG. 13 shows a constitution of the data bus scramble pattern memory 506. The data bus scramble pattern memory 506 consists of two decoders (decoder 1 and decoder 2) and four data latches (data latches 0 to 3). The data latches 0 to 3 are scramble pattern storage regions for scrambling the data of the work RAM, the backup RAM, the IO and the flash ROM, respectively. As shown in Table 4 shown later, the data latches 0 to 3 are allotted addresses 0 x 2000, 0 x 2001, 0 x 2002 and 0 x 2003, respectively.

The decoder 1 is a circuit which generates output enable signals *OE0 to *OE3 for selectively outputting scramble patterns stored in the data latches 0 to 3, respectively and logically constituted as shown in a truth table of Table 2 below.

TABLE 2

| A19 | A18 | A17 | A16 | *OE0 | *OE1 | *OE2 | *OE3 |
|-----|-----|-----|-----|------|------|------|------|
| 0 | 0 | 0 | 0 | 0 | 1 | 1 | 1 |
| 0 | 0 | 0 | 1 | 1 | 0 | 1 | 1 |
| 0 | 0 | 1 | 0 | 1 | 1 | 0 | 1 |
| 0 | 0 | 1 | 1 | 1 | 1 | 1 | 0 |
| 1 | * | * | * | 1 | 1 | 1 | 1 |
| * | 1 | * | * | 1 | 1 | 1 | 1 |

Further, the decoder 2 is a circuit which generates write enable signals *WE0 to *WE3 for writing new scramble patterns to the respective data latches 0 to 3 and logically constituted as shown in a truth table of Table 3 below.

TABLE 3

| *WEPMD | A0 | A1 | *WE0 | *WE1 | *WE2 | *WE3 |
|--------|----|----|------|------|------|------|
| 1 | * | * | 1 | 1 | 1 | 1 |
| 0 | 0 | 0 | 0 | 1 | 1 | 1 |
| 0 | 0 | 1 | 1 | 0 | 1 | 1 |
| 0 | 1 | 0 | 1 | 1 | 0 | 1 |
| 0 | 1 | 1 | 1 | 1 | 1 | 0 |

The data latches 0 to 3 store data D0 to D7 outputted to the data bus 512 at the timing at which their corresponding write enable signals *WE0 to *WE3 become 0, and output the scramble patterns stored therein as data SPD0 to SPD7 when their corresponding output enable signals *OE0 to *OE3 become 0. If all of the output enable signals *OE0 to *OE3 are 1, all bits of the SPD0 to SPD7 become 0.

In this embodiment, data on the data bus 512 has a width of 8 bits (D0 to D7), whereas data on the address bus 511 has a width of 16 bits (A0 to A15) except for expansion bits SA16 to SA19 irrespective of scrambling. While FIG. 13 shows the constitution of the data bus scramble pattern memory 506, the address bus scramble pattern memory 504 has a wider bit width of an address than that of data. Due to this, the data latches 0 to 3 shown in FIG. 13 are constituted of 2 bytes and addresses for selecting the respective data latches are constituted of A0 to A3 of 4 bits (in case of the data bus scramble pattern memory 506 shown in FIG. 13, addresses for selecting the data latches are A0 to A1 of 2 bits). The address bus scramble pattern memory 504 has the same constitution as that of the data bus scramble pattern memory except for the above architecture of data latches and address width. The illustration and further description of the address bus scramble pattern memory 504 will not be given herein.

In this embodiment, the data latches 0 to 3 of the data bus scramble pattern memory 506 and the data latches of the address bus scramble pattern memory 504 are allotted addresses shown in Table 4, respectively. Scramble patterns for executing scrambling with respect to the scramble target regions corresponding to the addresses are written into the respective addresses. The scramble patterns written into the respective data latches are outputted toward the scramble arithmetic circuit in accordance with address information (A0 to A19) outputted from the CPU 501.

TABLE 4

| address | target memory | target latch name | target region |
|---|---|---|---|
| 20000 | data bus | data latch 0 | work RAM |
| 20001 | scramble | data latch 1 | backup RAM |
| 20002 | pattern | data latch 2 | IO |
| 20003 | memory | data latch 3 | flash RAM |
| 20008 | address | data latch 0 lower level byte | work RAM |
| 20009 | bus | data latch 0 higher level byte | |
| 2000A | scramble | data latch 1 lower level byte | backup RAM |
| 2000B | pattern | data latch 1 higher level byte | |
| 2000C | memory | data latch 2 lower level byte | IO |
| 2000D | | data latch 2 higher level byte | |
| 2000E | | data latch 3 lower level byte | flash ROM |
| 2000F | | data latch 3 higher level byte | |

Table 5 shows an example of settings for the pattern memories in this embodiment.

TABLE 5

| region | address range | address bus scramble pattern | data bus scramble pattern |
|---|---|---|---|
| work RAM | 0 x 00000~0 x 0FFFF | 0 x 3CB0 | 0 x 25 |
| backup RAM | 0 x 10000~0 x 1FFFF | 0 x 2A50 | 0 x 6E |
| IO | 0 x 20000~0 x 2FFFF | 0 x 0000 | 0 x 00 |
| flash ROM | 0 x 30000~0 x 3FFFF | 0 x 41D9 | 0 x 2B |

The RAM adopted in this embodiment is a high-speed assessible element when an address having continuous lower level 4 bits is accessed. As shown in Table 5, therefore, the lower level 4 bits of each address bus scramble pattern in the RAM are set at 0 (which means scrambling is not performed), thus ensuring high speed access in case of continuous memory access from the CPU.

Further, all bits are set at 0 in the IO region so as to prohibit scrambling.

Figure 14:
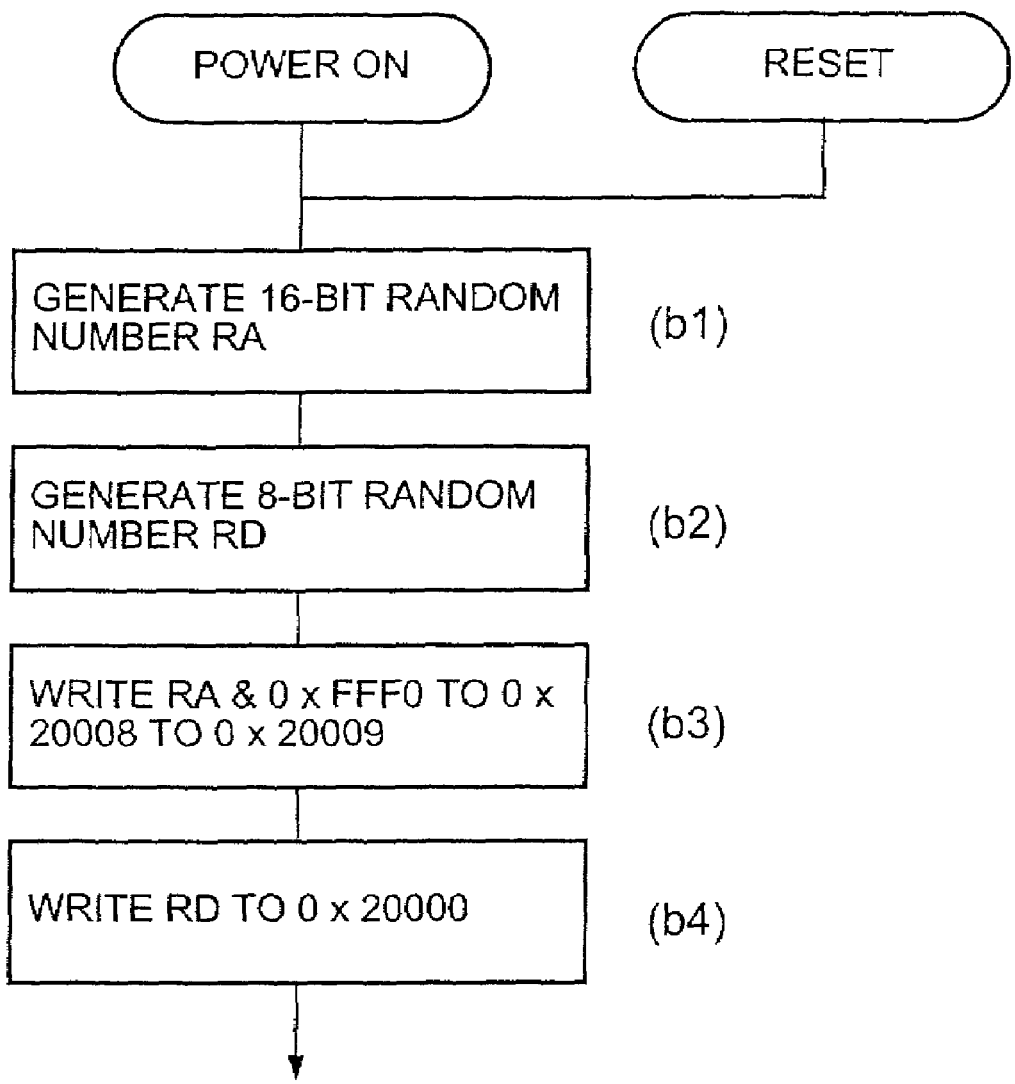
FIG. 14 shows a part of programs operated when the processing apparatus shown in FIG. 4 is powered on or reset.

FIG. 14 shows a part of a program operating when the processing apparatus shown in FIG. 4 is powered on or reset.

As shown in FIG. 14, a 16-bit random number RA and an 8-bit random number RD are generated (in steps b1 and b2), the result of an AND operation between the 16-bit random number RA and 0xFFF0 is written into the addresses 0 X 20008 to 0 x 20009, and the 8-bit random number RD is written into the address 0x20000 (in a step b3). As shown in Table 4, the addresses 0 x 20008 to 0 x 20009 indicate an address bus scramble pattern storage region for the work RAM and the address 0 x 20000 indicates a data bus scramble pattern storage region for the work RAM.

Namely, whenever the processing apparatus is powered on or reset, the scramble pattern of the work RAM is changed, which also contributes to making external illicit interpretation more difficult.

As for the backup RAM and the flash ROM, the consistency of the data and programs stored therein is necessary. Due to this, a preset scramble pattern is held for each memory and not changed even if the apparatus is powered on again or reset.

As for the flash ROM, it is also possible not to perform scrambling when data is written in a factory. In that case, when the apparatus is powered on for the first time since shipping, scrambling is performed according to the following procedures.

Figure 15:
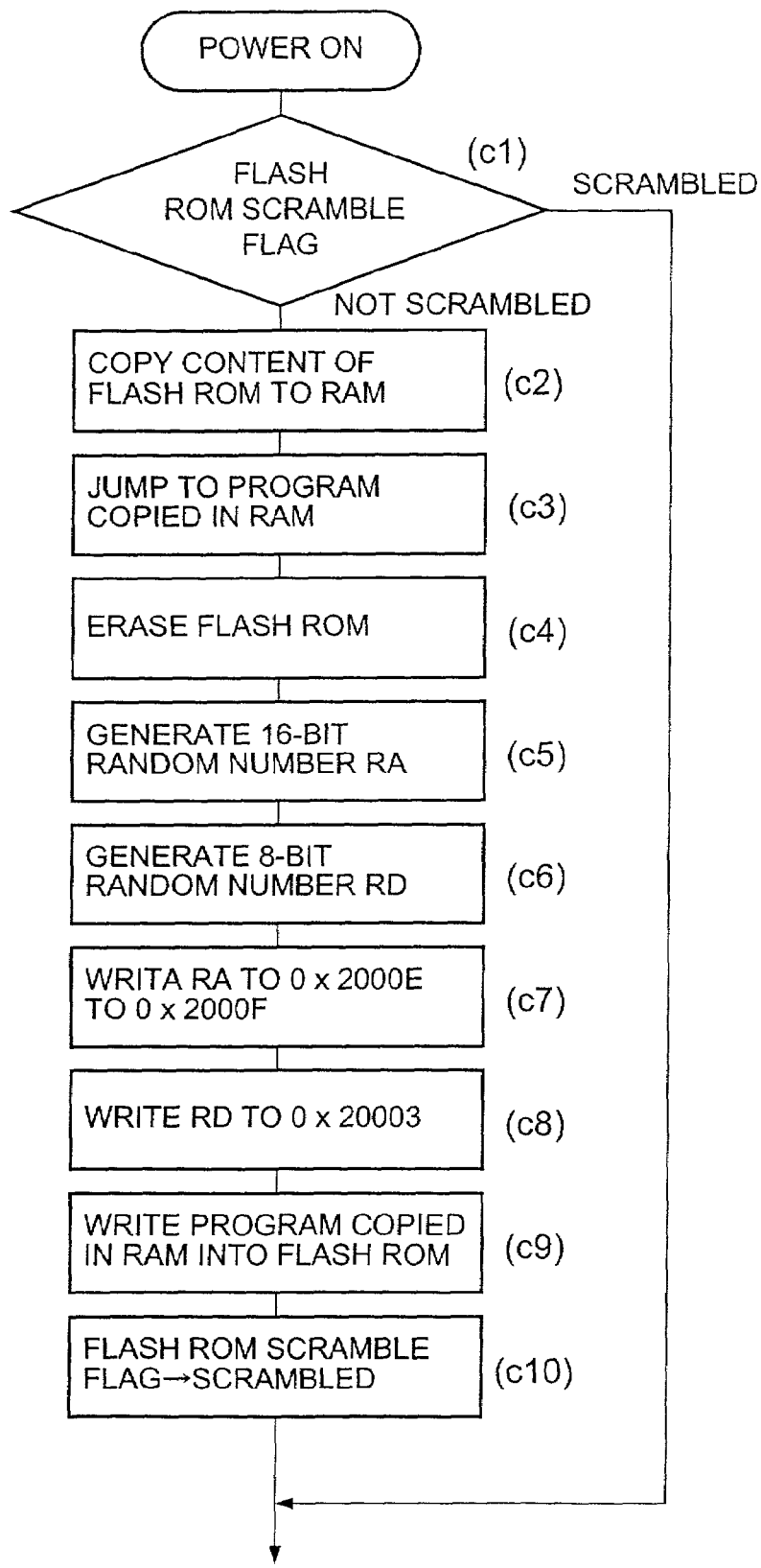

FIG. 15 is a flow chart showing a flash ROM scrambling part of the program operating when the apparatus is powered on.

In this flow chart, a scramble flag indicating whether or not the content of the flash ROM was scrambled is checked first. The scramble flag is stored in a predetermined address of the backup RAM. When the backup RAM is written in a factory, the scramble flag is set at "not scrambled".

The reason for checking the scramble flag is to determine whether or not the content of the flash ROM has been already scrambled. In stead of setting the scramble flag, a scramble pattern corresponding to the flash ROM may be read and it may be determined that the flash ROM has not been scrambled yet by confirming that all bits of the scramble pattern thus read are 0.

If it is determined that the scramble flag is set at "not scrambled" in a step c1, a step c2 follows in which the content of the flash ROM is copied in the RAM. Programs for conducting the following processings are written in a part of this flash ROM.

Next, among the programs copied into the RAM, a program for conducting the following processing is controlled. Then, the flash ROM is erased (in a step c4), a 16-bit random number RA and an 8-bit random number RD are generated (in steps c5 and c6), the 16-bit random number RA is written, as the address scramble pattern of the flash ROM, into the addresses 0 x 2000E to 0 x 2000F and the 8-bit random number RD is written, as the data scramble pattern of the flash ROM, into the address 0 x 20003 (see Table 4; in steps c7 and c8).

Next, the programs copied in the RAM in the step c2 are scrambled by the address scramble pattern and the data scramble pattern written into the addresses 0 x 2000E to 0 x 2000F and 0 x 20003, respectively and written back into the flash ROM (in a step c9), and the flash ROM scramble flag is changed to "scrambled" (in a step c10).

By doing so, the content of the flash ROM is scrambled when the processing apparatus is first powered on.

At the time of shipment from the factory, the content of the flash ROM may be scrambled in a specified scramble pattern, and scrambled again in another scramble pattern when the processing apparatus is first powered on. In that case, a descramble pattern (which is a scramble pattern itself since the scrambled content can be returned to original one by referring to the scramble pattern) for returning the content of the flash ROM which was scramble at the time of shipment from the factory to the original content, may be written into the scramble pattern memory or in the flash ROM. If written into the flash ROM, it is advantageously unnecessary to back up the scramble pattern memory by a battery and the like.

Figure 16:
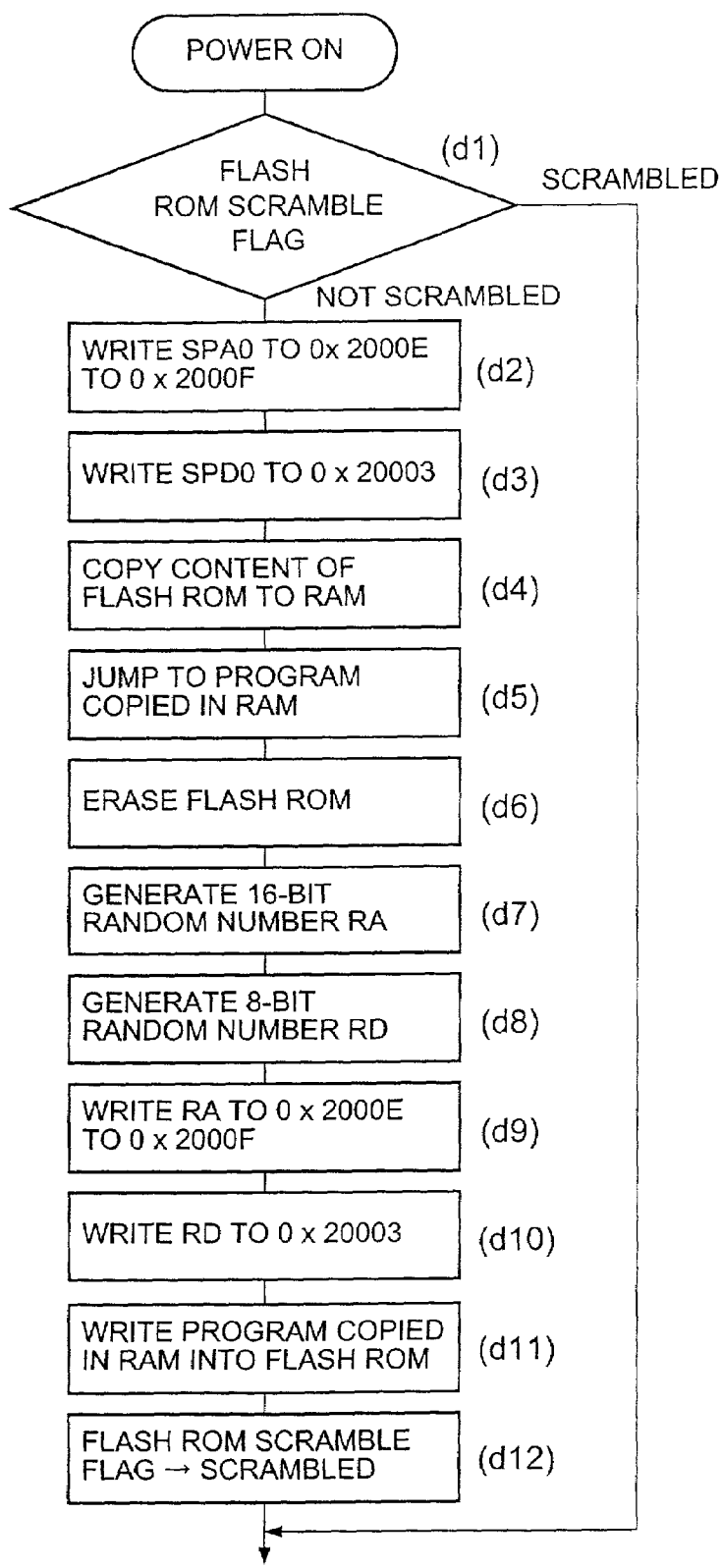
FIG. 16 is a flow chart showing a flash ROM scrambling part of the program operating when power is turned on if a processing apparatus is shipped while scrambled programs are written into the flash ROM in advance, a descramble pattern necessary for descrambling the programs is stored in a flash ROM.

FIG. 16 is a flow chart showing a flash ROM scrambling part of the program operating when the apparatus is powered on if the apparatus is shipped while a program scrambled in advance is written into the flash ROM and a scramble pattern needed for descrambling is stored in the flash ROM. This program is executed instead of the program shown in FIG. 15.

In a step d1, a scramble flag indicating whether or not the flash ROM has been already scrambled except for scrambling before shipment from the factory, is referred to. If no scrambling is conducted except for scrambling before shipment from the factory, steps d2 to d12 are executed.

In the steps d2 and d3, the address bus scramble pattern SPA0 and the data bus scramble pattern SPD0 stored in the flash ROM are written into addresses 0 x 2000E to 0 x 2000F and 0 x 20003 respectively (see Table 4).

Next, in the step d4, the content of the flash ROM is returned to a state before the flash ROM is scrambled based on scramble patterns SPA0 and SPD0, and the resultant content is copied in the RAM.

The following steps d5 to d12 are the same as the steps c3 to c10 shown in FIG. 15, respectively. The repetitive description thereof will not be, therefore, given herein.

By executing the program shown in FIG. 16, the content of the flash ROM is scrambled again with random numbers RA and RB newly generated when the apparatus is first powered on, and the scrambled state is held thereafter.

The above example shows that the scramble pattern is written into the flash ROM. It is also possible to scramble, for example, the content of the flash ROM in scramble patterns different according to individual products before shipment from the factory, to descramble patterns for descrambling the individual scramble patterns by a specific ciphering processing, and to write the descramble patterns into a region other than the flash ROM, such as the backup RAM. In that case, procedures for a deciphering processing to return the ciphered scramble patterns to scramble patterns which are not ciphered, are embedded in a certain region in the LSI 50.

To conduct the above ciphering processing, a public key ciphering system (e.g., RAS and the like) can be utilized. That is, a descramble pattern ciphered by a public key (Kpb) is written into the flash ROM or a memory other than the flash ROM. The ciphered scramble pattern is deciphered by a secret key (Kpv) embedded in a certain region in the LSI 50. In case of such a system, even if a plurality of companies employ LSIs 50 of the same specification, respectively, security between the companies can be ensured by passing only the public key to the respective companies and the secret key is kept secret.

Figure 17:
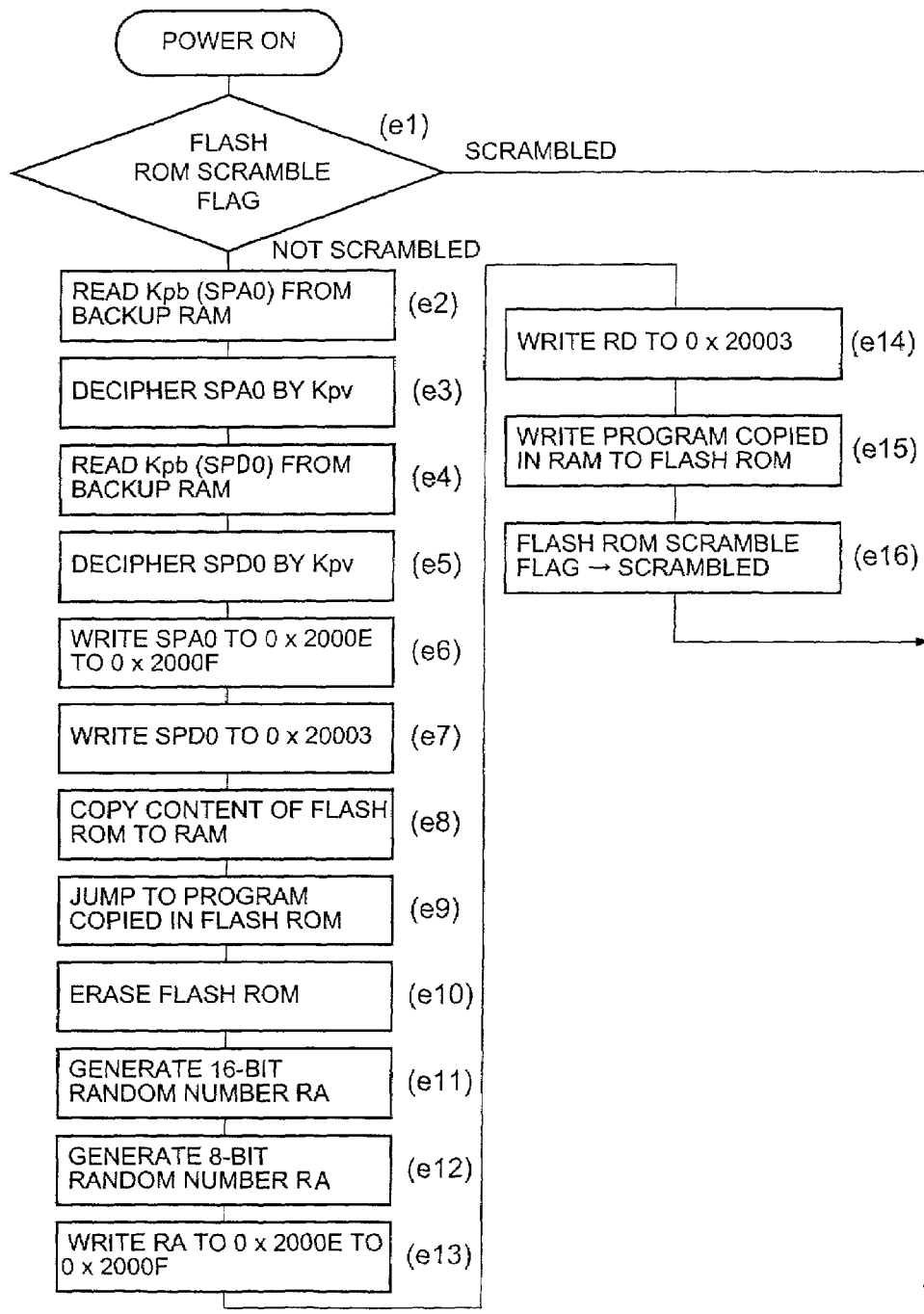
FIG. 17 is a flow chart showing a flash ROM scrambling part of the program operating when power is turned on after a processing apparatus is shipped while the flash ROM is scrambled before shipment from a factory, a descramble pattern for descrambling the flash ROM is ciphered by a public key Kpb and stored in a backup RAM.

FIG. 17 is a flow chart showing a flash ROM scrambling part of the program operating when the apparatus is powered after a state in which the flash ROM is scrambled before shipment from the factory, a scramble pattern for descrambling the scrambled flash ROM is ciphered by a public key Kpb and stored in the backup RAM.

In steps e2 and e3, the address bus scramble pattern Kpb (SPA0) which was ciphered by the public key is read from the backup RAM and deciphered by the secret key Kpv embedded in the LSI, to thereby fetch an address bus scramble pattern SPA0 in a plain text.

In steps e4 and e5, the data bus scramble pattern Kpb (SPD0) which was ciphered by the public key is read from the backup RAM and deciphered by the secret key Kpv embedded in the LSI, thereby fetching a data bus scramble pattern in a plain text.

In steps e6 and e7, the address bus scramble pattern SPA0 and the data bus scramble pattern SPD0 in plain texts obtained as stated above are written into the addresses 0 x 2000E to 0 x 2000F and the address 0 x 20003, respectively (see Table 4).

The following steps e8 to e16 are the same as the steps d4 to d12 shown in FIG. 16, respectively. The repetitive description thereof will not be, therefore, given herein.

Figure 18:
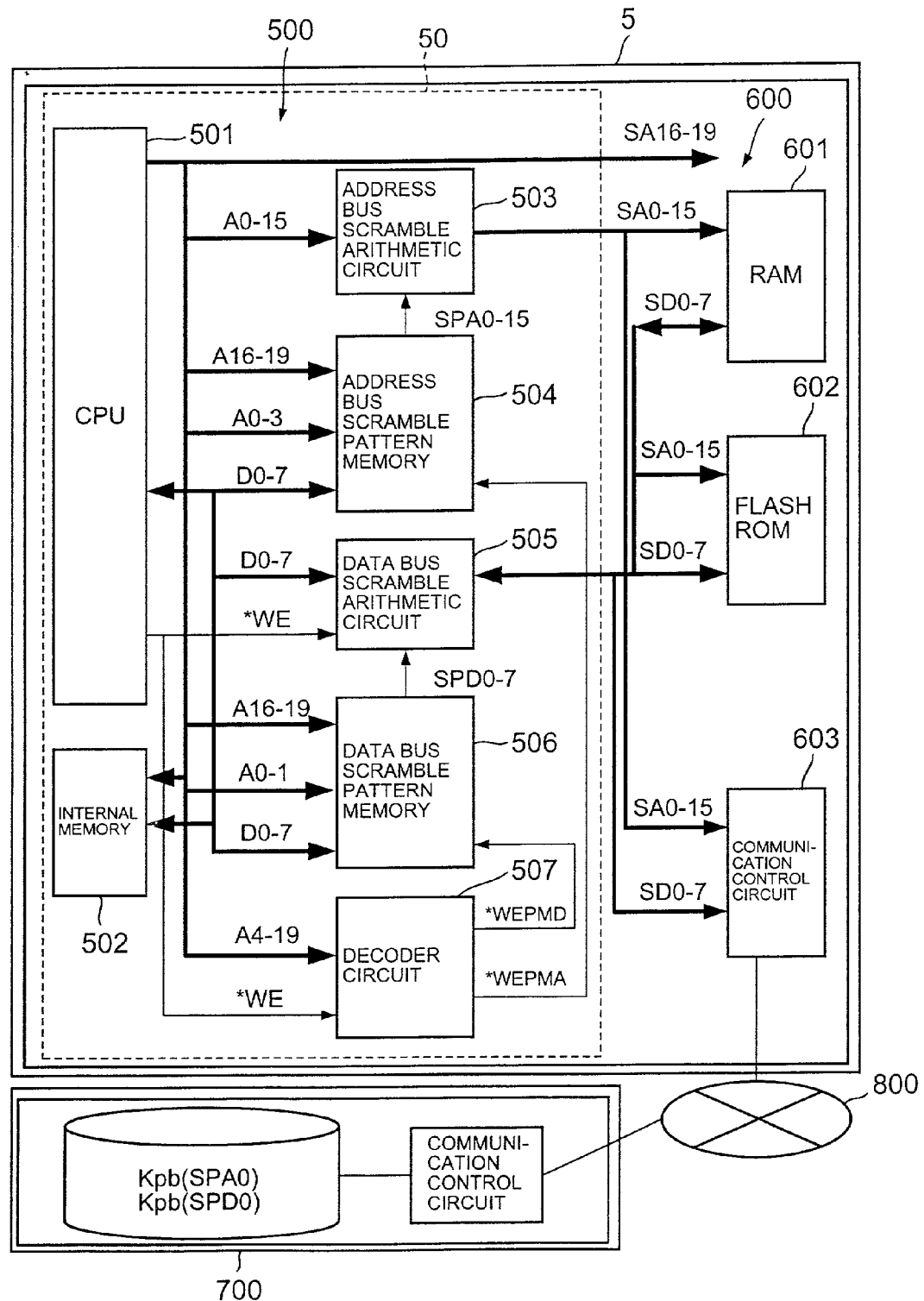
FIG. 18 is a block diagram of the third embodiment of a processing apparatus according to the present invention.

FIG. 18 is a block diagram of the third embodiment of a processing apparatus according to the present invention.

Description will be given to the differences of the third embodiment from the second embodiment shown in FIG. 4.

In this third embodiment, an external circuit 600 is provided with an RAM 601 and a flash ROM 602 similar to those in the second embodiment shown in FIG. 4, and further provided with a communication control circuit 603.

The communication control circuit 603 is connected to a key management center 700 through a communication network 800. Programs scrambled before shipment from a factory are stored in the flash ROM 602. The flash ROM 602 is constituted such that when the apparatus is first powered on, the flash ROM 602 receives deciphered scramble patterns through the communication network 800.

Figure 19:
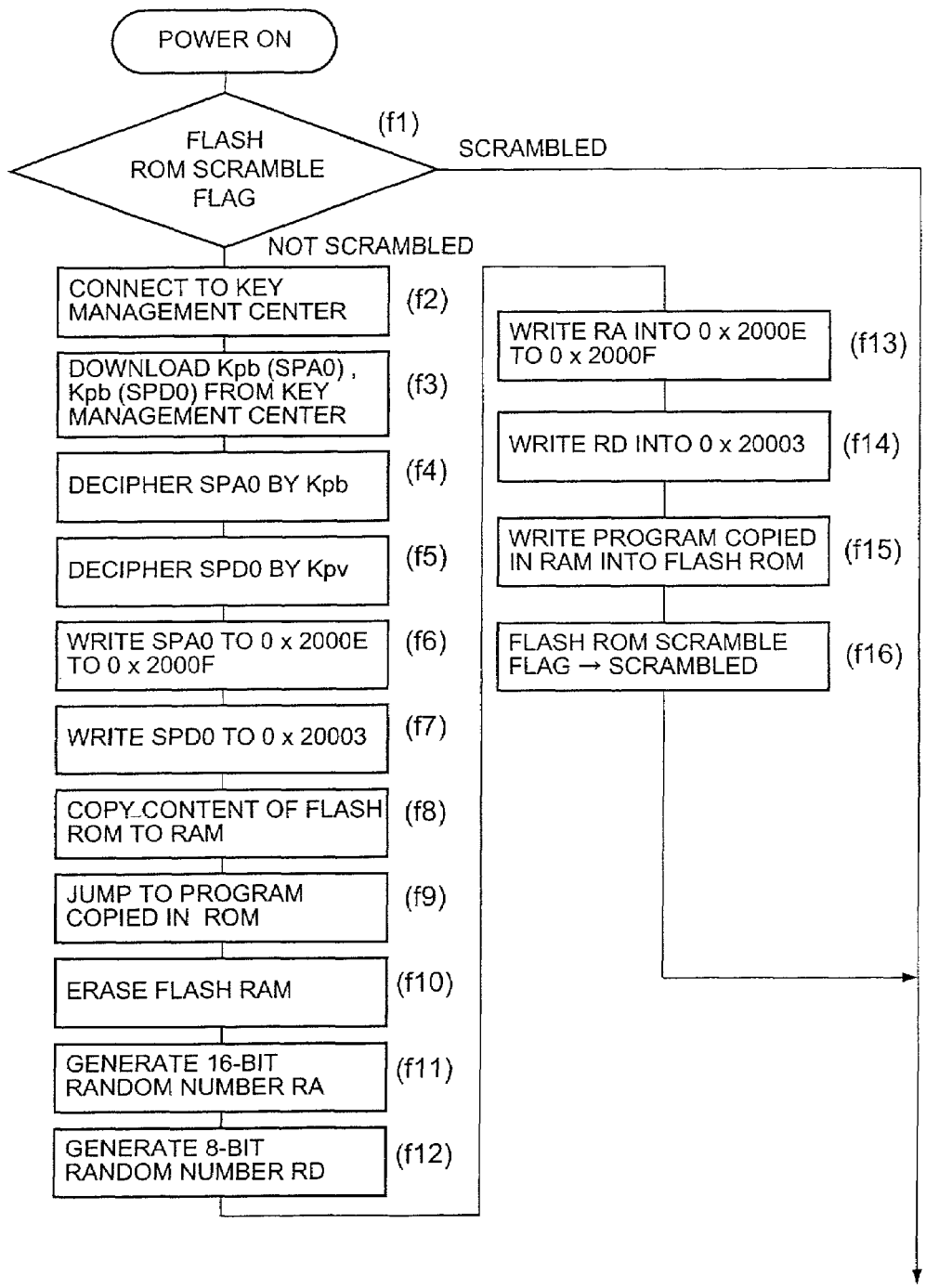

FIG. 19 is a flow chart showing a flash ROM scrambling part of the program executed when the processing apparatus shown in FIG. 18 is powered on.

A step F1 shown in FIG. 19 is the same as the step e1 shown in FIG. 17.

In a step f2, the communication control circuit is connected to the key management center. In a step f3, an address bus scramble pattern Kpb (SPA0) and a data bus scramble pattern Kpb (SPD0) ciphered by a public key Kpb are downloaded from the key management center.

In steps f4 and f5, the ciphered address bus scramble pattern Kpb (SPA0) and the ciphered data bus scramble pattern Kpb (SPD0) are deciphered by a secret key Kpv embedded in an LSI, and an address bus scramble pattern SPA0 and a data bus scramble pattern SPD0 in plain text are fetched.

The following steps f6 to f16 are the same as the steps e6 to e16 shown in FIG. 17. The repetitive description thereof will not be, therefore, given herein.

As can be understood from the above, by allowing scramble patterns to be acquired from an external section such as the key management center through communications, system flexibility can be ensured.

Figure 20:
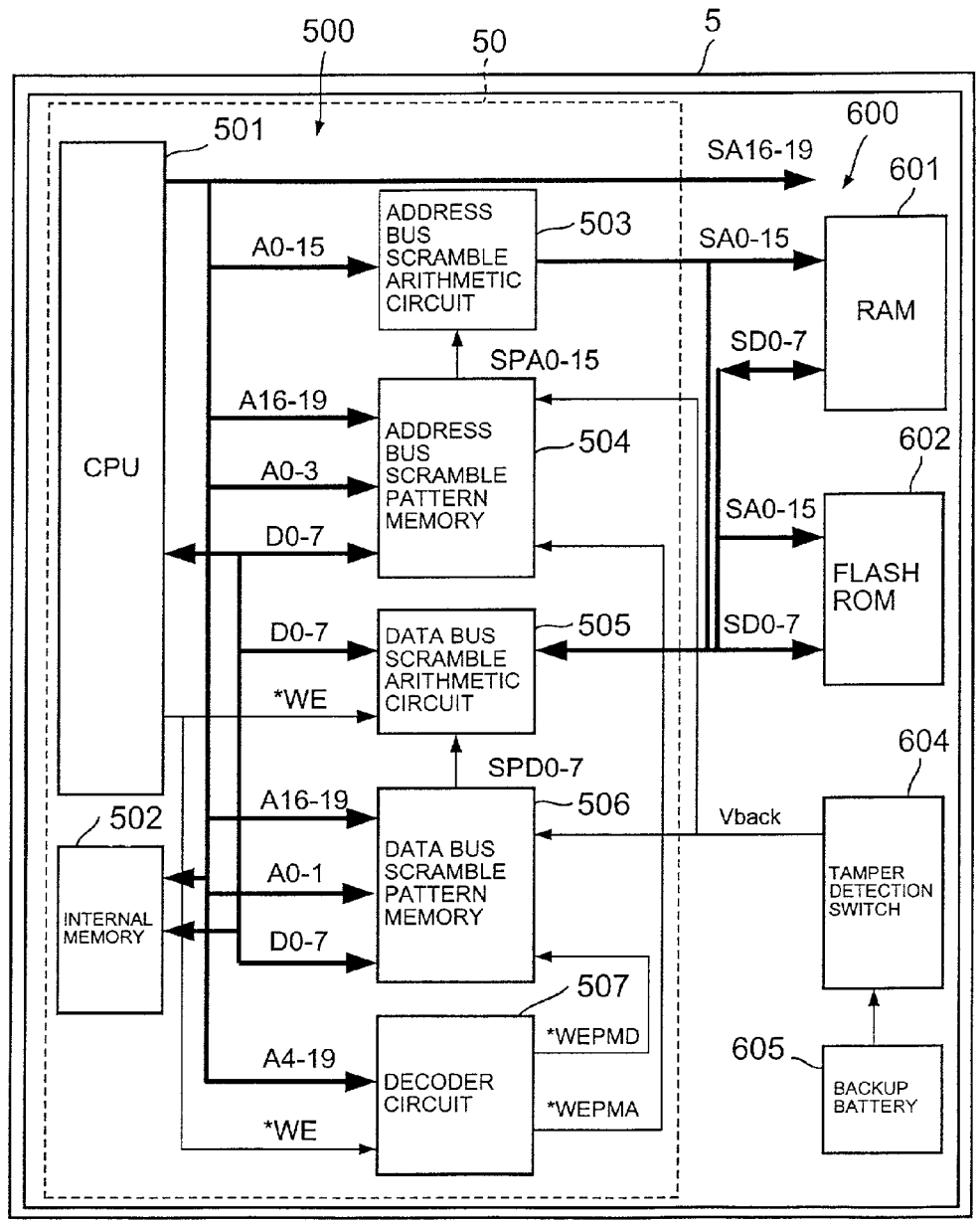
FIG. 20 is a block diagram of the fourth embodiment of a processing apparatus according to the present invention.

FIG. 20 is a block diagram of the fourth embodiment of a processing apparatus according to the present invention.

Description will be given to the differences of the fourth embodiment from the second embodiment shown in FIG. 4.

In the fourth embodiment shown in FIG. 20, an external circuit 600 is provided with an RAM 601 and a flash ROM 602 similar to those in the second embodiment shown in FIG. 4 and also provided with a tamper detection switch 604. Besides, a backup battery 605 is explicitly shown.

An address bus scramble pattern memory 504 and a data bus scramble pattern memory 506 are backed up by power supplied from the backup battery 605 so that the contents of these memories are not erased even if the processing apparatus is powered off.

Here, if this processing apparatus 5 is illicitly opened, the tamper detection switch 604 is actuated. Then, a power supply path from the backup battery 605 is shut off, an address bus scramble pattern and a data bus scramble pattern stored in the address scramble pattern memory 504 and the data bus scramble pattern memory 506, respectively, are erased and the processing apparatus is thereby disabled. By doing so, it is possible to further ensure preventing illicit interpretation.

In the above-stated embodiments, the circuit incorporated into one LSI is referred to as an internal circuit and a group of devices provided externally of the LSI is referred to as an external circuit. The internal circuit is not necessarily mounted on one LSI. It is also possible, for example, that if a circuit is dispersed and mounted on a plurality of LSIs and the plurality of LSIs are packaged in one integrated circuit package or integrally molded, then the entire circuit dispersed and mounted on these plural LSIs may be referred to as an internal circuit.

What is claimed is:

1. A processing apparatus comprising:
   an internal circuit comprising:
      a CPU executing programs, said CPU is supplied with a first clock and executes the programs synchronously with the supplied first clock, and,
      at least one internal device having a predetermined function, and a bus line extending internally of the internal circuit and connecting said CPU to said internal device, the bus line comprising an externally extending portion extending externally of the internal circuit and an address bus and a data bus transferring an address and data, respectively, wherein said internal circuit includes at least one internal memory as an internal device, the internal memory storing a program for determining ciphering patterns; and an external circuit provided externally of the internal circuit and connected with the externally extending portion of said bus line and including at least one external device having a predetermined function, wherein said external circuit includes at least one external memory as an external device, wherein said internal circuit further comprises a ciphering section interposed at an entrance to an external side of said internal circuit, and ciphering the address and the data on the bus line by the ciphering patterns according to a plurality of regions divided from an address space allotted to entirety of said at least one external device, to thereby prevent illicit access to the internal memory via the external memory, said ciphering section is supplied with a second clock and performs ciphering synchronously with the supplied second clock and a clock supply section for supplying the second clock at a higher speed than a speed of the first clock supplied to said CPU, to said ciphering section, so that one of the ciphering patterns that is made by using a result of one of other ciphering patterns among the ciphering patterns can be employed.

2. A processing apparatus according to claim 1, wherein the ciphering patterns adopted by said ciphering section include one ciphering pattern in which neither the address nor data is ciphered.

3. An processing apparatus according to claim 1, wherein said external circuit includes a plurality of external devices; and said ciphering section performs ciphering using ciphering patterns according to said plurality of external devices, respectively.

4. A processing apparatus according to claim 1, wherein the ciphering section of the internal circuit further comprises a bus interface that externally outputs data ciphered by the ciphering section when access to the external device is requested and externally outputs dummy data when access to the external device is not requested.

5. A processing apparatus according to claim 1, comprising:

ciphering pattern determination means for recognizing a constitution of said external circuit and determining a ciphering pattern of said ciphering section according to the constitution of said external circuit.

6. A processing apparatus according to claim 1, wherein said ciphering section ciphers the address and the data on said bus line by ciphering patterns according to the plurality of regions divided from the address space allotted to the entirety of said no less than one external device and according to application programs executed by said CPU.

7. A processing apparatus according to claim 1, comprising:

a deciphering section connected to the externally extending portion of said bus line, and returning the ciphered address and the data on the bus line to an address and data which are not ciphered.

8. A processing apparatus according to claim 1, comprising:

ciphering pattern change means for changing a ciphering pattern whenever a predetermined initialization operation is carried out for one of the plurality of regions divided from the address space allotted to the entirety of said at least one external device.

9. A processing apparatus according to claim 1, wherein said ciphering section adopts a ciphering pattern in which ciphered data is changed according to the address, for one of the plurality of regions divided from the address space allotted to the entirety of said at least one external device, to thereby cipher the data.

10. A processing apparatus according to claim 1, wherein said internal circuit holds a ciphering pattern adopted by said ciphering section;

the processing apparatus further comprises a tamper detection section detecting tamper; and ciphering pattern destruction means for destroying the ciphering pattern held in said internal circuit in response to tamper detection made by said tamper detection section.

11. An integrated circuit constituted by mounting:

a CPU executing programs and is supplied with a first clock and executes the programs synchronously with the supplied first clock;

at least one internal device having a predetermined function, wherein at least one internal device is an internal memory, the internal memory storing a program for determining ciphering patterns;

a bus line extending internally of the integrated circuit and connecting said CPU to said internal device, the bus line comprising an externally extending portion extending externally of the integrated circuit and an address bus and a data bus, wherein at least one external device having a predetermined function is provided externally of integrated circuit and connected with the externally extending portion of the bus line, and the bus line transferring an address and data via the address bus and the data bus, respectively, wherein at least one external device is an external memory; and a ciphering section interposed at an entrance to an external side of the integrated circuit, and ciphering the address and the data on the bus line by the ciphering patterns according to a plurality of regions divided from a space allotted to entirety of the at least one external device, to thereby prevent illicit access to the internal memory via the external memory, said ciphering section is supplied with a second clock and conducts ciphering synchronously with the supplied second clock and operates with the second clock at a higher speed than a speed of the first clock with which said CPU operates, so that one of the ciphering patterns that is made by using a result of one of other ciphering patterns among the ciphering patterns can be employed.

12. An integrated circuit according to claim 11, wherein the ciphering patterns adopted by the ciphering section include one ciphering pattern in which neither the address nor data is ciphered.

13. An integrated circuit according to claim 11, wherein in case where a plurality of external devices are provided externally of the externally extending portion of said bus line, said ciphering section performs ciphering by the ciphering patterns according to said plurality of external devices, respectively.

14. An integrated circuit according to claim 11, wherein the ciphering section of the internal circuit further comprises a bus interface that externally outputs data ciphered by the ciphering section when access to the external device is requested and externally outputs dummy data when access to the external device is not requested.

15. An integrated circuit according to claim 11, comprising:

ciphering pattern determination means for recognizing a constitution of said external circuit, and for determining a ciphering pattern of said ciphering section according to the constitution.

16. An integrated circuit according to claim 11, wherein said ciphering section ciphers the address and the data on said bus line by ciphering patterns according to the plurality of regions divided from the address space allotted to the entirety of said no less than one external device and according to application programs executed by said CPU.

17. An integrated circuit according to claim 11, comprising:

ciphering pattern change means for changing a ciphering pattern whenever a predetermined initialization operation is performed, for one of the plurality of regions divided from the address space allotted to the entirety of said at least one external device.

18. An integrated circuit according to claim 11, wherein said ciphering section ciphers the data by adopting a ciphering pattern in which ciphered data is changed according to the address, for one of the plurality of regions divided from the address space allotted to the entirety of said at least one external device.

* * * * *